United States Patent [19]

Hamilton et al.

[11] Patent Number: 5,438,404
[45] Date of Patent: Aug. 1, 1995

[54] GYROSCOPIC SYSTEM FOR BORESIGHTING EQUIPMENT BY OPTICALLY ACQUIRING AND TRANSFERRING PARALLEL AND NON-PARALLEL LINES

[75] Inventors: Stephen B. Hamilton, Baltimore; James J. Jaklitsch, Parkton; Christopher J. Reed, Pasadena; Charles E. Sachulz, Jarrettsville; Robert R. Schulze, Baltimore; Leslie H. Debelius, Manchester; Niall B. McNelis, Baltimore, all of Md.

[73] Assignee: AAI Corporation, Cockeysville, Md.

[21] Appl. No.: 990,976

[22] Filed: Dec. 16, 1992

[51] Int. Cl.⁶ .......................... G01B 11/26; G01C 1/10
[52] U.S. Cl. ........................... 356/152.2; 356/141.1; 356/149
[58] Field of Search ............ 356/141, 152, 149, 141.1, 356/152.2

[56] References Cited

U.S. PATENT DOCUMENTS

| | | |
|---|---|---|
| 3,731,543 | 5/1973 | Gates . |
| 3,734,627 | 5/1973 | Edwards . |
| 3,739,646 | 6/1973 | O'Connor et al. . |
| 3,803,387 | 4/1974 | Lackowski . |
| 3,930,317 | 1/1976 | Johnston . |
| 4,012,989 | 3/1977 | Hunt et al. . |
| 4,134,681 | 1/1979 | Elmer ................................. 356/152 |
| 4,483,080 | 11/1984 | Knoll ................................. 33/286 |
| 4,649,274 | 3/1987 | Hartmann . |
| 4,738,531 | 4/1988 | Lloyd et al. ....................... 356/152 |
| 4,762,411 | 8/1988 | Pitalo et al. . |
| 4,844,383 | 7/1989 | Hassenpflug . |
| 4,884,771 | 12/1989 | Scheit et al. . |
| 4,896,032 | 1/1990 | Ball et al. . |
| 4,919,528 | 4/1990 | Pitalo et al. . |

Primary Examiner—Stephen C. Buczinski
Attorney, Agent, or Firm—Venable, Baetjer, Howard & Civiletti

[57] ABSTRACT

A gyroscopic system and method is provided for translating parallel and non-parallel lines between a reference line and a device to be aligned with respect to the reference line. A first inertial sensor is provided that is configured to be substantially stationary. This inertial sensor is boresighted with respect to the reference line and includes at least two gyroscopes and a mirror having first and second nonplanar surfaces. A second, portable inertial sensor is provided that includes a gimbal, a gimbal drive system, an electronic energy beam generator, a collimator, and at least two gyroscopes. One or more of the electronic beam generator, collimator, and gyroscopes can optionally be mounted on a platform that is mounted on the gimbal and adapted to move in accordance with signals from the gimbal drive system. A control circuit is provided that is operable to measure output signals generated by the first and second inertial sensor gyroscopes and to determine relative orientations of the inertial sensors.

16 Claims, 33 Drawing Sheets

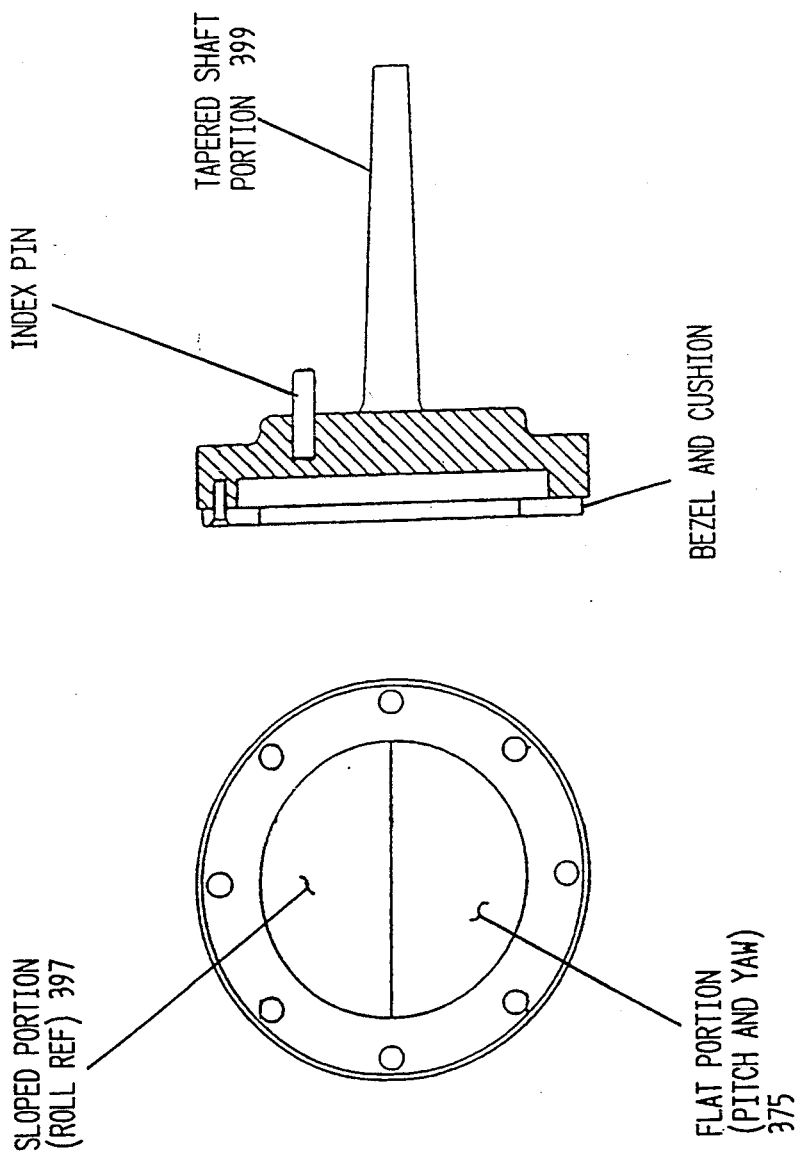

GYROSCOPIC SYSTEM FOR BORESIGHTING EQUIPMENT BY OPTICALLY ACQUIRING AND TRANSFERRING PARALLEL AND NON-PARALLEL LINES

The U.S. Government has rights in this invention as set forth in contract no. DAAJ02-90-C-0034, awarded by the U.S. Army.

BACKGROUND OF THE INVENTION

1. Field of the Invention

The present invention relates generally to a system for aligning a device using the relative orientation of two structural lines, two virtual lines, or one structural and one virtual line. The invention further relates to a method and apparatus for optically acquiring a reference line and transferring parallel or non-parallel lines to determine the orientation of a device with respect to the reference line.

2. Background of the Related Art

In order to control equipment such as sensors, guns, cameras and antennae mounted on vehicles such as aircraft or spacecraft, it is important to align the equipment boresights with respect to a reference axis on the vehicle. A number of methods exist for bringing weapon or navigational stations into alignment with the Armament Datum Line (ADL) on a variety of aircraft. The ADL defines the center line of the aircraft; however, it is more than simply a line because it also provides a roll reference. Although reference is made to an ADL for alignment applications involving spacecraft and aircraft, the present invention is also useful in oil drilling, civil engineering, construction and medical applications, among others, which involve the alignment of any device with respect to a structural or virtual reference line.

One alignment method using the ADL of an aircraft, as shown in FIG. 1, involves attaching two brackets or adapters 20 and 22 to an aircraft 24 at two respective locations along the ADL 26. In addition, each station on the aircraft is fitted with its own adapter (not shown). A telescope 28 is then installed in the leading or forward end 22 bracket and is used to align with the rear or aft end bracket. With reference to FIG. 2, a target board 30 is set at a precise distance from the telescope 28. The target board is aligned so that a reticle 32 from the telescope falls upon a ADL fiducial 34 on the target board. The telescope is then moved from station adapter to station adapter while each station is boresighted with its own fiducial 36 on the target board. The use of the telescope and target board is limited to the transfer of parallel lines to align stations.

In the second alignment method, a "Christmas Tree" adapter 40 is attached to the aircraft (see FIG. 3) and is aligned to the ADL. Additional adapters (not shown) are also provided on each station and a telescope 42 is positioned at various points 44, 46 and 48 around the tree to align each station. In order to accommodate all the stations on an aircraft, this tree is necessarily large and onerous. Again, this method of alignment is limited to the transfer of parallel lines.

Both of these methods for boresight alignment have procedural and equipment aspects which seriously limit their ultimate accuracy. Some of these limitations include: the reliance on the proper alignment of the human eye with the optical system (parallax) for error readings; the correct positioning of the target board not only in standoff position but in pitch, yaw and roll positions; the use of a finite focal length reticle as a reference; the movement of the target board during alignment on the flightline due to wind and other factors; the warping or bending of the Christmas tree; and the movement of the aircraft itself, among other limitations.

Beyond accuracy, there are two other factors which make these methodologies undesirable: the size and weight of the auxiliary equipment, and the time needed to complete a station alignment. For example, the mounting stand 50 (FIG. 2) for a target board is 10 feet tall and weighs approximately 500 pounds. The alignment procedure for an aircraft using the target board requires the elevation of the front of the aircraft to relieve weight on the nose wheel using a 600 pound jack. The station adapters themselves typically weight 25 to 35 pounds and are awkward. The alignment procedure for the Apache helicopter typically involves removal of the windshield in order to install the "Christmas Tree" alignment adapter for a heads-up display.

The two boresighting methods discussed above employ optics to acquire the reference axis. A number of boresighting systems exist which employ gyroscopes to align a device with respect to another device. For example, U.S. Pat. No. 4,012,989 to Hunt et al. discloses an inertial sighting system for slewing the axis of a device which is mounted on an aircraft. The disclosed system comprises a pair of gyroscopes and a hand-held sighting device, which also comprises a pair of gyroscopes. Both sets of gyroscopes are initially caged to align the spin axis on each gyroscope on the aircraft mounted device with the spin axis of a corresponding one of the gyroscopes on the hand-held device to establish an arbitrary reference system between the two devices. Once the gyroscopes are uncaged on the sighting device, data is continuously fed from the hand-held device to generate orientation command signals for a gun.

U.S. Pat. No. 3,731,543 to Gates discloses a gyroscopic boresight alignment system comprising a master sensor unit having two gyroscopes which is mounted on an aircraft with respect to its armament data line. The system also comprises a remote sensor unit having a single gyroscope which is mounted on equipment. The misalignment of equipment is determined by comparing angular rates of the aircraft and equipment axes with respect to a parallel relationship with the ADL.

U.S. Pat. No. 3,930,317 to Johnston discloses an electronic azimuth transfer system comprising a navigator which is mounted on a vehicle. A remote sensor coupled to the navigator aligns itself with respect to North as does the navigator. The remote sensor is thereafter moved to a gun or other equipment to indicate equipment alignment with respect to North.

Prior gyroscopic alignment systems such as those discussed in the above-referenced patents are disadvantageous for several reasons. They are limited in operation to transfer only parallel lines with respect to a reference line, i.e., the ADL. Further, the systems in the Johnston and Gates patent do not provide for 3-axis detection. As a result, the accuracy of these systems is limited by the manner in which the gyroscopes on the master and slave inertial sensors are oriented with respect to each other. Specifically, if the hand held sensor is inadvertently rotated around the spin axis of the single gyro, the gyro senses no motion. Thus, the other two axes will no longer align with the axes of the double-gyro unit. This will cause a "cross coupling" error in the information produced by the device.

BRIEF DESCRIPTION OF THE DRAWINGS:

The various objects, advantages and novel features of the invention will be more readily understood from the following detailed description when read in conjunction with the appended drawings, in which:

FIGS. 19A and 19B, and 20A and 20B depict, respectively, side and front views of a boresight reference mirror constructed in accordance with the present invention;

DETAILED DESCRIPTION OF INVENTION

While the present invention is designed to be used for alignment on any device needing information on the relative orientation of two structural lines, two virtual lines, or one structural and one virtual line, the invention is described in connection with aircraft weapon and sensor station alignment for illustrative purposes. The present invention measures the error in the boresight orientation of the stations on an aircraft by finding the orientation of the station under test with respect to the aircraft center line or armament datum line (ADL). The ADL is a set of hard reference points installed into the airframe of each aircraft at the time of manufacture. The misalignment between the ADL and the various stations is established by optically acquiring the ADL of the subject aircraft and then translating this line over to the weapon or sensor stations. The present invention optically acquires the individual station orientations, determines the offset from the desired orientation, and displays the offset on an operator screen. The station can then be brought into alignment and re-checked with the advanced boresight electronics ("ABE") that will be described in detail below. The invention does not require that the correct alignment of the station be parallel to the ADL.

Figure 1:
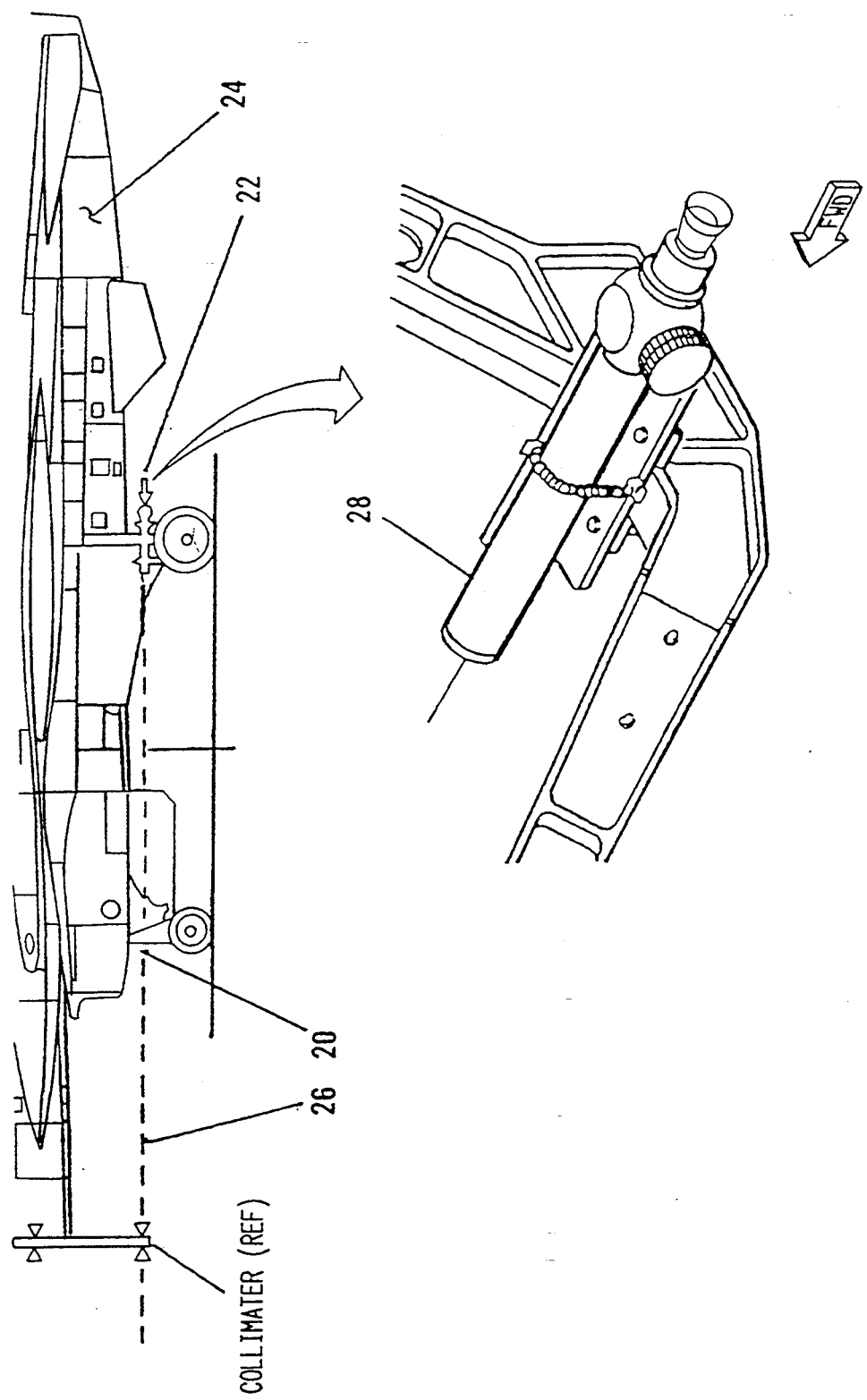
FIGS. 1 and 2 depict a prior aircraft equipment alignment system employing a target board.
Figure 2:
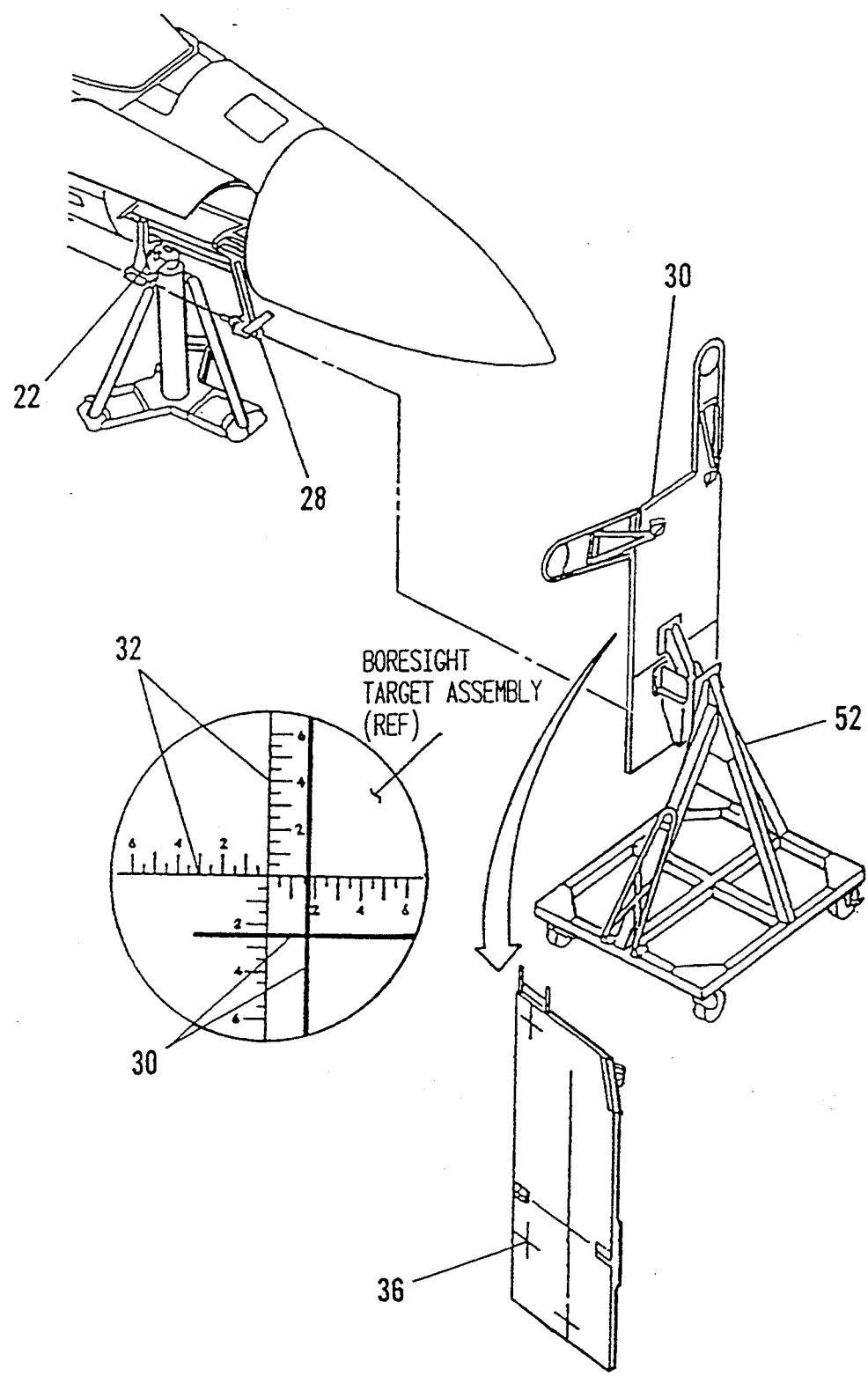
Figure 3:
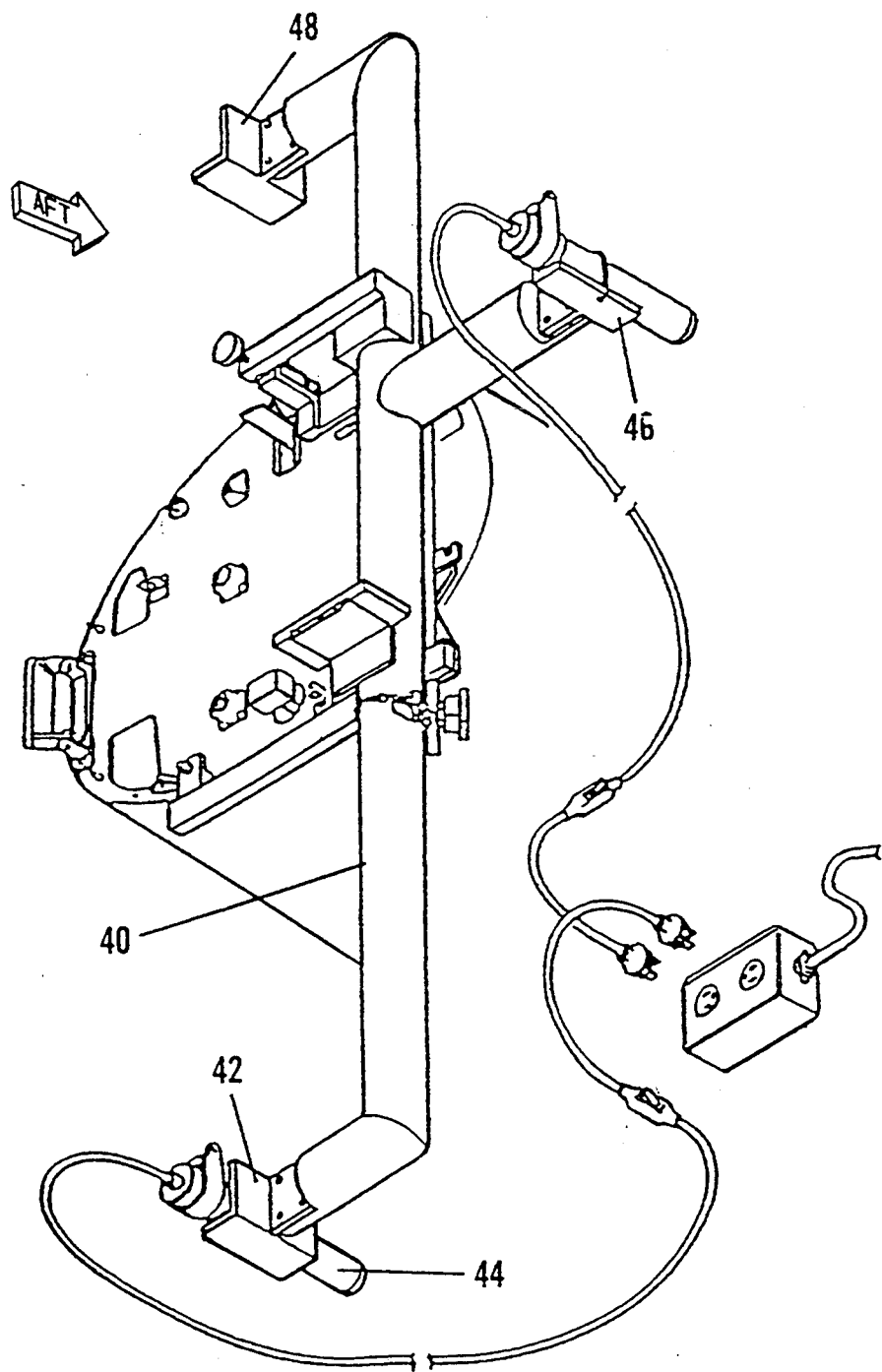
FIG. 3 depicts a prior aircraft equipment alignment apparatus for mounting a telescope in various positions.
Figure 4:
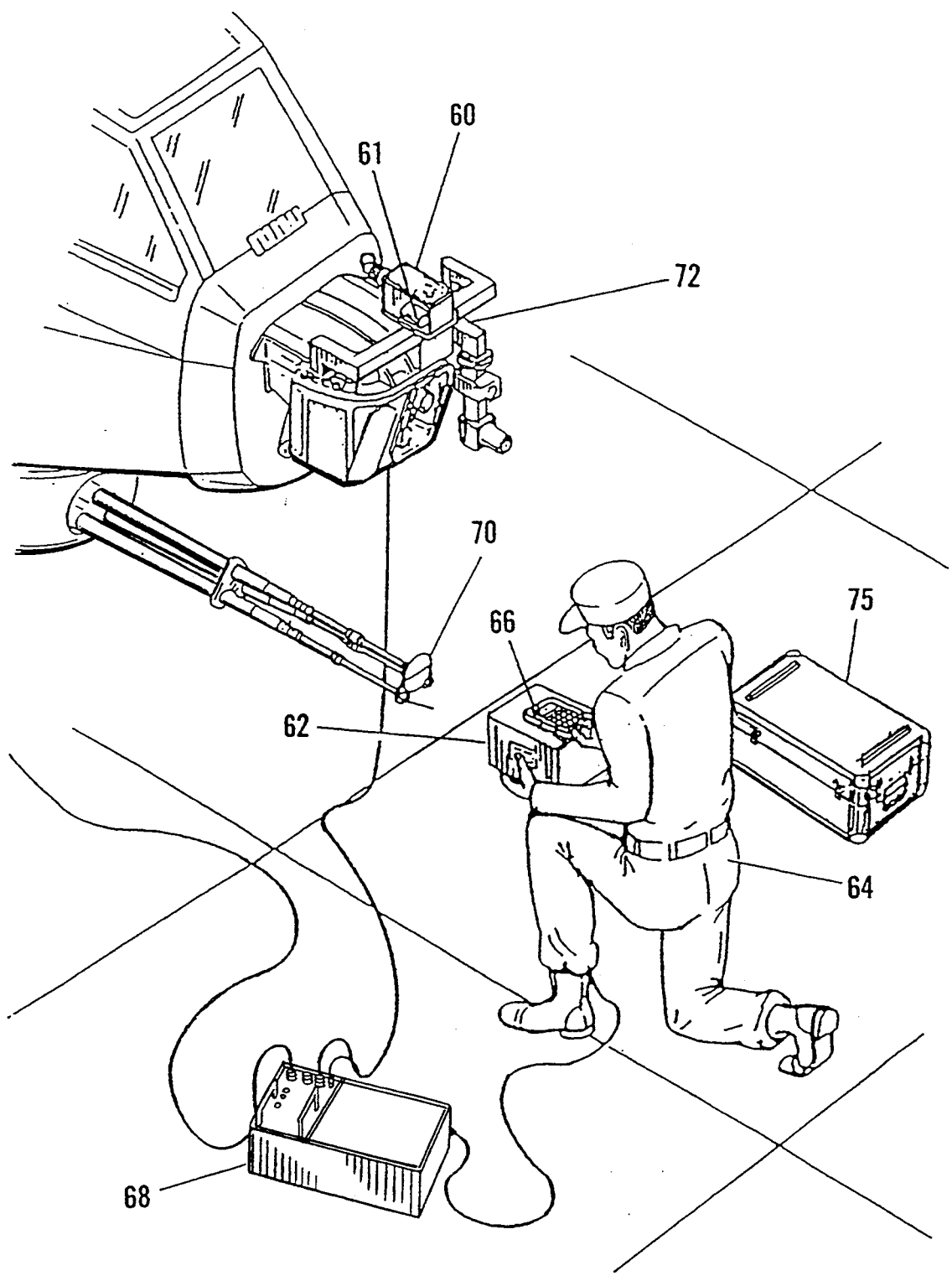
FIG. 4 depicts major components of the present invention.
Figure 5:
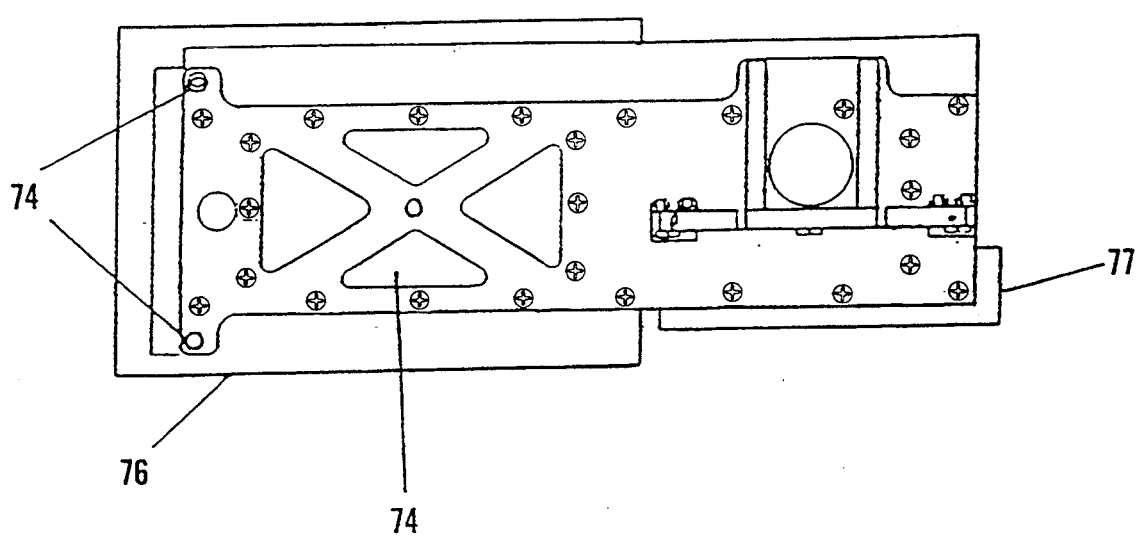
FIG. 5 depicts the front view of an inertial fixture for mating a boresight inertial unit (BIU) with a common mode intertial unit (CMIR) in accordance with the present invention.
Figure 5A:
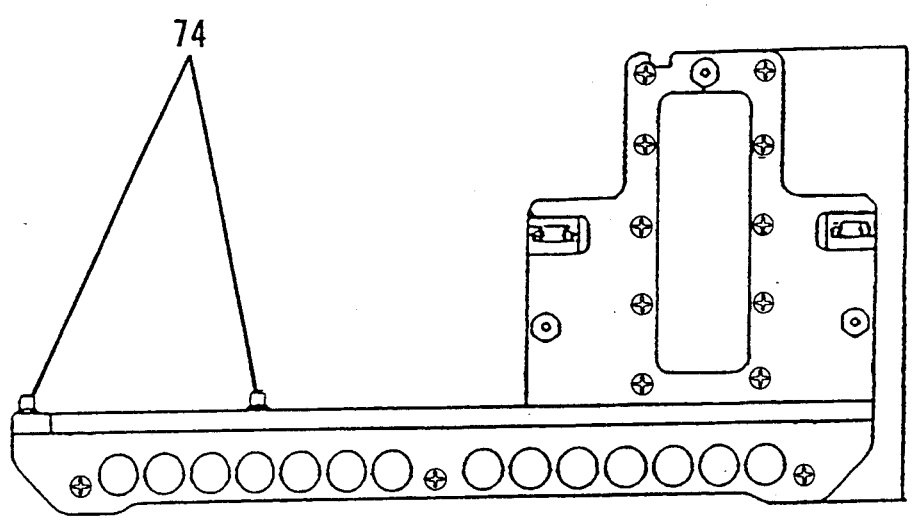
FIG. 5A is a bottom view.
Figure 5B:
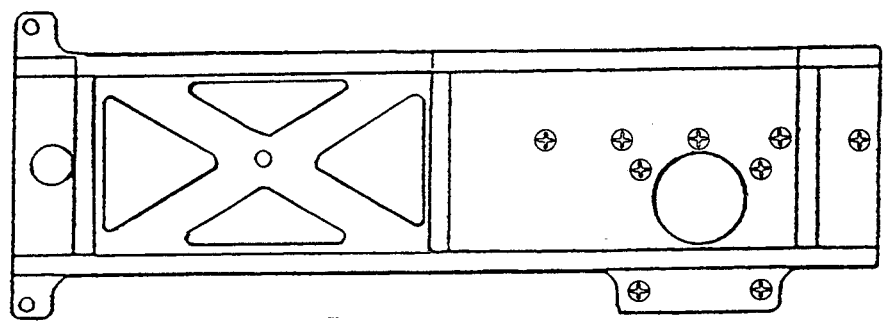
FIG. 5B is a back view.
Figure 5C:
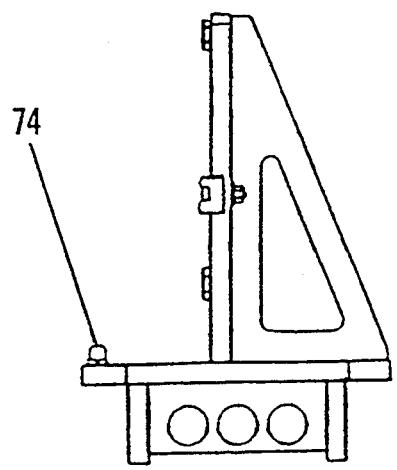
FIG. 5C is a side view of the inertial fixture of FIG. 5.

FIG. 4 depicts the major components of the invention as they would be employed on the flight line. The major components of the invention fall into two categories: components common to any system under test, and the components peculiar to the system under test. The common components are:

Common Mode Inertial Reference Unit (CMIR)
Boresight Inertial Unit (BIU)
System Controller
Hand Held Display Unit (HHDU)
Boresight Reference Mirror The CMIR 60 houses two dynamically tuned gyroscopes (DTG's) with their associated gyro and microcontroller electronics. The CMIR incorporates a permanent mirror 61 for acquisition of the CMIR orientation. The mirror has two perpendicular surfaces, referred to herein as the 0 degree mirror and the 90 degree mirror. The CMIR case also provides a unique interlocking mount for the boresight reference mirror. The CMIR receives its power and control interface from the System Controller through an interface cable. The CMIR is attached to the aircraft ADL and thus determines ADL orientation.

The BIU 62 houses a video auto collimator (VAC), a gimbal, a gimbal drive system, two dynamically tuned gyroscopes (DTG's) mounted on the VAC, and the associated gyro and microcontroller electronics. The BIU receives its power and control interface from the System Controller interface cable. Localized control of the gimbal structure, collimator, and self test is provided by an integral BIU controller. The BIU is hand-held by the alignment technician 64, who carries the BIU from the ADL to the various stations.

The HHDU 66 provides the alignment technician with operator information and allows operator input to the ABE system. System commands are entered via the HHDU keypad. The HHDU display provides indicators for the current operational mode, measurement results, and general system status.

The System Controller 68 is the main command and control point for the invention. In addition to containing the system control processor and the interface to the BIU, CMIR, and HHDU, it contains power supplies and the power distribution system. The System Controller has been built with the accommodation for the personality modules, which are described in further detail below.

The boresight reference mirror 70 provides the reflecting surface needed to perform boresight measurements on various stations. Multiple versions of this unique design allow for the acquisition of pitch, yaw, and roll within various sets of desired accuracies.

The aircraft peculiar equipment is that equipment needed to interface the ABE common equipment to a specific aircraft. It includes the following major assemblies:

ADL Adapter
28 VDC power cable
115 VAC -400 Hz Adapter
Various weapon stations/sensor adapters The ADL adapter 72 attaches to the aircraft's ADL hard points, and is used to establish the ADL boresight reference. As such, the ADL adapter design varies by aircraft type. The ADL adapter contains the mounting provisions for the CMIR, which remains mounted to the adapter throughout the boresighting procedure. The design for some of the various ADL adapters is described below.

The power cables (not shown) needed to operate the invention from aircraft power are provided as part of the aircraft peculiar equipment, since the power receptacle connector and pin-out varies by aircraft.

The adapters required to interface the invention to the various stations vary by aircraft type. An adaptor for a station 74 can be provided along with the aircraft adaptor 72 and other station adapters (not shown) in an aircraft peculiar adapter kit 75. The present invention is designed to maximize the use of existing boresight adapters. When new adapter designs are required for use with the invention, they are preferably designed to minimize weight and size.

The above-referenced components of the boresighting system of the present invention shall be described in further detail below in accordance with the following general outline:

I. Theory of Operation
II. Description of Hardware Components
  A. Boresight Inertial Unit (BIU)
  B. Common Mode Inertial Unit (CMIR)
  C. System Controller
  D. Hand-Held Display Unit (HHDU)
  E. Boresight Reference Mirror
III. Description of System Software

I. Theory of Operation

The present invention performs its boresighting operation quickly and efficiently by optically acquiring the ADL of the aircraft and transferring it to the various weapons and sensors stations. Prior to the alignment procedure, the ADL and all the stations to be boresighted are fitted with adapters as necessary.

The first step in the boresighting process is to mate the BIU and the CMIR together in order to characterize turn-on drifts within the sets of gyroscopes associated with the BIU and the CMIR. The turn-on drift of a gyroscope is different each time the equipment is powered on. A BIU/CMIR inertial fixture is used to provide this mating and is depicted in FIGS. 5, 5A, 5B and 5C. The BIU 62 is mounted on the BIU alignment screws 76, while the CMIR 60 is bolted into the CMIR mounting points 78. During the characterization procedure, the System Controller commands the BIU gimbal to move to three different orientations and determines turn-on drift constants, i.e., one for each axis in the two sets of gyroscopes. Each BIU orientation is associated with a direction cosine matrix for its rotation from the initial position. These three $3 \times 3$ matrices are combined with the three $3 \times 3$ non-rotated matrices of the CMIR. Solution of the pseudo-inverse of the resultant $6 \times 9$ matrix leads to the values of the turn-on drift constants. This is equivalent to solving 9 non-independent linear equations in 6 unknowns.

After the turn-on drifts have been determined, the System Controller 68 commands a CMIR controller associated with the CMIR (and described in further detail below) to temporarily desensitize a torquer scale factor for the CMIR gryo set from approximately 8.8 to 65 degrees/second; however, different values can be selected in accordance with such factors as intended use and the operational environment. This scale factor determines the maximum rate at which the gimbal can be rotated and still remain in calibration. Setting the higher value allows the CMIR to be moved from the BIU/CMIR Inertial Fixture to the ADL adapter without disrupting the turn-on drift characterization; however, switching does cause degradation in accuracy of the system of the present invention. The system maintains the relative orientation of the BIU and the CMIR.

After the CMIR 60 is attached to the ADL adapter mount 72 (FIG. 4), the CMIR gyro scale factor is reset to the more sensitive value. Re-alignment of the CMIR and BIU is undertaken to regain the high accuracy. This re-alignment is done optically. An alignment technician positions the BIU in the vicinity of the CMIR. Upon operator request via the HHDU, the BIU Controller commands the gimbal to conduct a spiral search pattern. This causes a collimated laser beam from the BIU's video auto collimator (VAC) to spiral until the beam reflected from the permanent boresighting mirror 61 on the CMIR is captured.

Once a reticle from the VAC is identified during the spiral scan, i.e., the laser energy has been reflected from the CMIR mirror 61, and directed onto a CCD array or other sensor in the VAC. The orientation offset is calculated from the offset of the reflected reticle to a center pixel in the array. The center pixel is determined during VAC assembly and provided as a parameter to the System Controller. The orientation offset is provided to a Gyrostabilization Loop which operates during the Floating Gimbal Mode.

Figure 6:
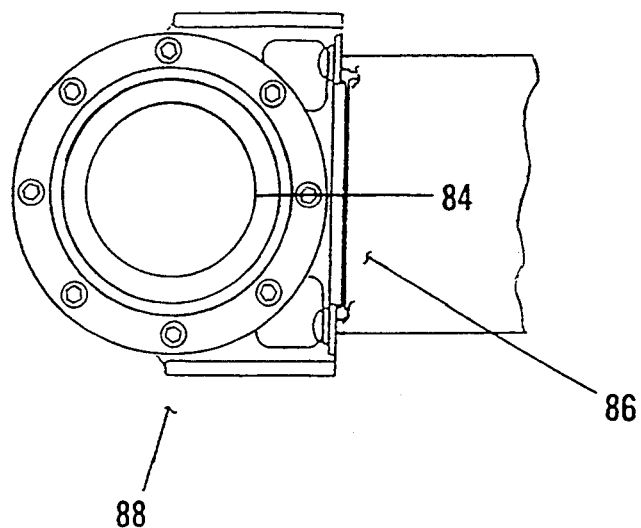
FIGS. 6 and 7 depict front and top views, respectively, of the permanent mirror mounted on the CMIR.
Figure 7:
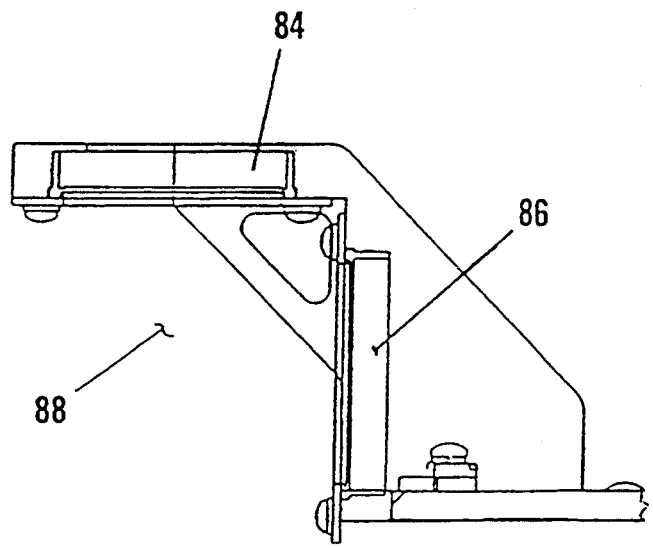

Capture occurs when the optical axis of the VAC (as defined by the laser beam axis) is normal to the CMIR 0 degree mirror and thus parallel to the ADL. This optical capture is performed twice, once for the on-axis or 0 degree mirror and once for the off-axis or 90 degree mirror. This mirror set is shown in FIGS. 6 and 7 which are front and top views, respectively, of the CMIR mirror and which show the 0 degree 84 and 90 degree mirrors 86 mounted to a bracket assembly 88. Use of an off-axis mirror allows determination of the roll orientation. Once captured, the ABE electronics continually adjusts the gimbal to preserve the parallelism of the VAC optical axis and the ADL. This mode, where the VAC is maintaining the ADL orientation, is called the free floating gimbal mode. A second operational mode is possible; if for some reason rotation of the BIU case is too extreme where the gimbal might hit its stops, the system can go into a "pseudo-strap down" mode (referred to as the Strap-Down Mode). In this mode, the VAC aligns itself with its own BIU case. The misalignment of the VAC and the CMIR is calculated and stored as the BIU moves. The system can be switched back to the Free Floating Gimbal Mode when the BIU is brought into the vicinity of the station under test. This mode switch can be accomplished automatically or manually.

At this point, the boresight mirror 62 is mounted into an adapter 74 coupled to the first station to be aligned. If there is a desired offset in the orientation of this station with respect to the ADL, the pitch, yaw, and roll offsets are fed into the HHDU. For example, a weapon station can be mounted on the aircraft to have a line of sight that is elevated or perpendicular with respect to the ADL. This offset causes the BIU gimbal to rotate to that new orientation and this new orientation is then maintained. Thus, non-parallel nominal boresight lines (NBLs) can be transferred from the acquired ADL. This capability is advantageous over prior systems which transfer only parallel lines and therefore are limited to aligning only those stations that are parallel in the aircraft. Once the desired station orientation is set, the gimbal is commanded to acquire the boresight mirror 70. The new orientation of the gimbal is used as the center of the search spiral. Again, this capture can be performed on both on-axis and off-axis mirrors for roll orientation, as well as pitch and yaw. Other mirrors, however, which have only one mirror surface on stations such as guns for which roll orientation is irrelevant can be used. Upon acquisition, the actual orientation of the station is given with respect to the ADL or, as the case may be, the desired orientation. The result is displayed on an operator screen on the HHDU 66 in terms of offset angles of pitch, roll, and yaw.

If the station involves a virtual alignment, no capture of the VAC laser beam is needed. Either the collimated beam (laser or infrared) from the VAC is used as a reference and is projected into the station, or the station under test can project its own reticle into the VAC. In the case of heads-up display alignment, a technician sits in the cockpit while another technician points the BIU through the windscreen at him. The technician in the cockpit can actually see the reticle image of laser beam due to the focusing action of his eye. He then aligns the VAC reticle with the reference reticle of the HUD. In the case of an infrared (IR) sensor, the BIU produces an IR beam parallel to the laser beam. This beam is directed into the sensor optics and the sensor is brought into alignment with the VAC beam.

II. Description of Hardware Components

A. BIU

Figure 8:
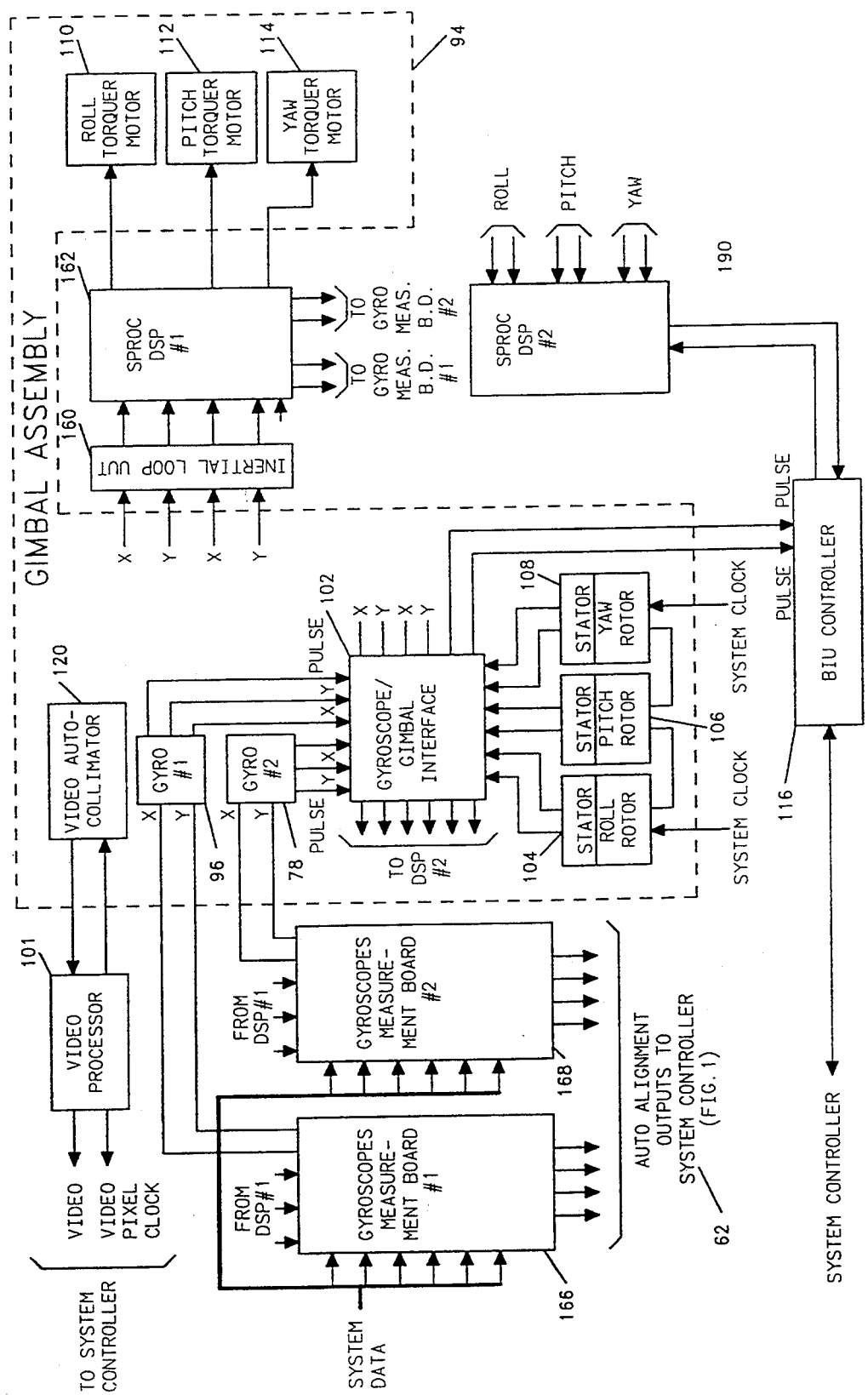
FIG. 8 is a schematic diagram of a BIU constructed in accordance with the present invention.

The system block diagram for the BIU is shown in FIG. 8. The major elements of the BIU design comprise a gimbal and associated gimbal electronics which are represented as a number of components within a broken-line box 94 labelled gimbal assembly. The gimbal assembly comprises two gyroscopes 96 and 98, a video auto-collimator 100, a gyroscope/gimbal interface 102, rotors and stators for roll, pitch and yaw 104, 106 and 108, respectively, and roll, pitch and yaw torquer motors 110, 112 and 114.

The BIU comprises BIU controller electronics, generally designated as 116, which is preferably an embedded microcontroller which allows remote control of the BIU optics and gimbal positioning by the System Controller 68. It is also used to enhance the BIU built-in-test (BIT) capabilities. Use of the BIU controller 116 reduces the number of conductors in the cable that connects the BIU with the System Controller. Simply, the System Controller 68 determines the angle at which the gimbal should be pointing, and the BIU controller 116 is commanded to make corrective rotations toward the desired position. The BIU controller also facilitates testing of the BIU as an independent assembly.

Figures 9, 10:
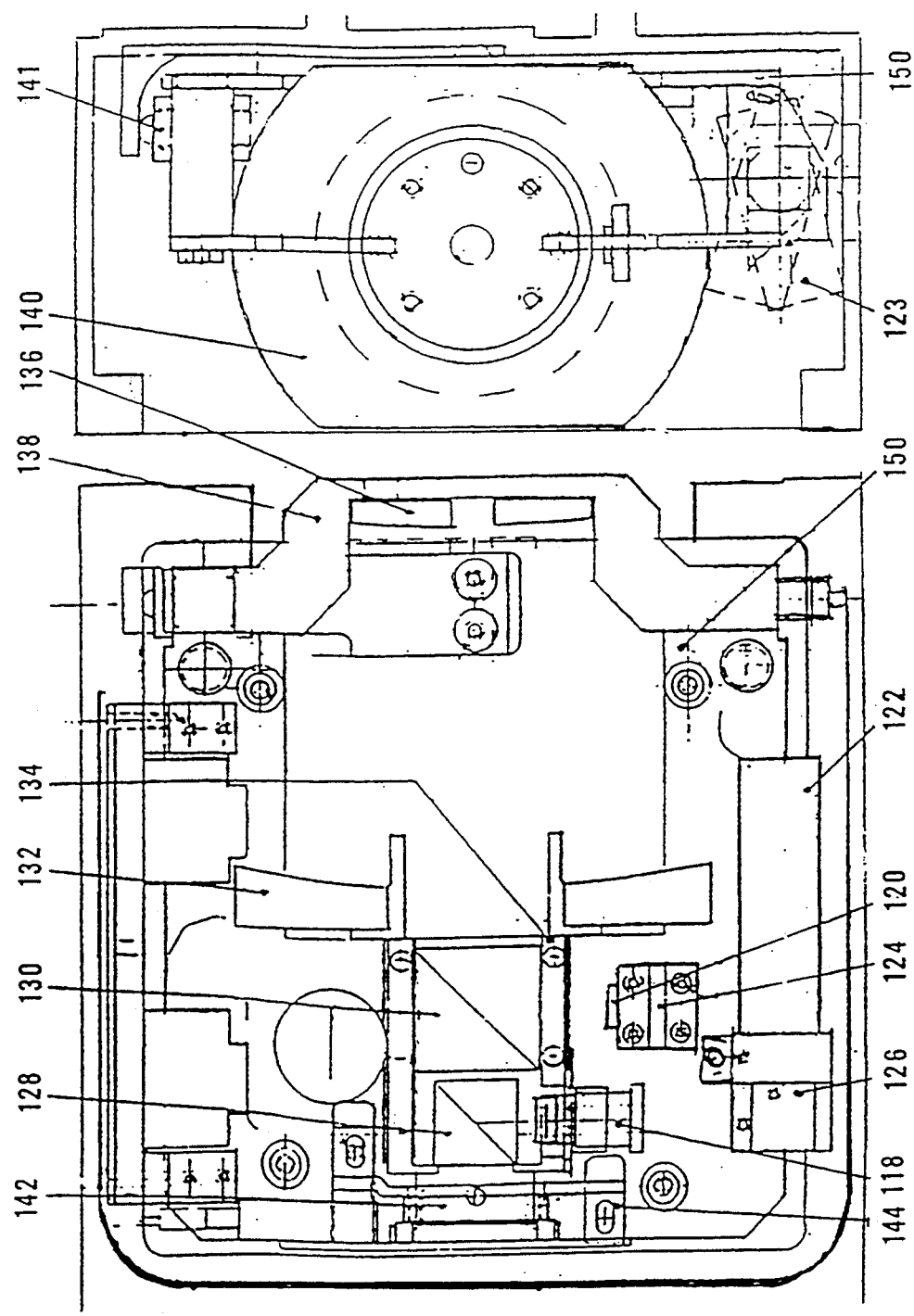
FIGS. 9 and 10 are top and front views, respectively, of the video auto-collimator of the BIU.

The VAC 100 is the optical measuring device of the BIU. Top and front views of the VAC are provided in FIGS. 9 and 10, respectively. The VAC comprises a visible reticle holder 118 and an infrared (IR) reticle 120, as well as a laser 122 and an infrared source 124, to produce, respectively, two reticle images, one in the visible and one in the far IR. Both of these images are collimated and exit the VAC parallel to one another. The beam collimating optics of the VAC comprise a laser beam circularizer 126, a cube beamsplitter 128 for the visible reticle, a BaF$_2$ dichroic cube beamsplitter 130 for the visible and infrared reticles, a primary mirror 132, a holding bracket 134 for the primary mirror, a secondary mirror 136 and spider-arm mirror holder 138 therefor, and a ZnSe window 140. A plate-case adjustment screw 141 is provided to allow for fine adjustments of the invar mounting in yaw. The phantom lines 123 in FIG. 10 illustrate how the laser housing can be rotated to elevate the laser beam in pitch, which helps collimate the projected reticle image and project it through the window 140 and out of the VAC. A collimated image is an image that appears to be at an infinite distance; i.e., the light rays of given beam enter or leave the optics parallel to each other.

The VAC collimated image is either used directly as a reference for virtual alignment, or is reflected from the external boresight mirror back into the VAC for passive alignment. For passive alignment, the reflected image is focused onto an imaging array 142, i.e., a CCD sensor or camera which is mounted by a bracket 144. The location of the focal spot on the imaging array 142 determines the angular offset of the mirror axis (normal) from the VAC optical axis. The signals from the imaging array are sent to the VAC electronics 101 for processing and then to the Signal Controller. The high accuracy of the BIU is obtained by measuring the offset of the reticle axis from the gyro axis and then commanding all rotations around the reticle axis. This procedure eliminates all errors due to the misalignment of the gimbal or VAC mechanical axes. It also eliminates the errors due to the gimbal bearings.

In order to maintain the high resolution of which the system is capable throughout the alignment process, it is necessary to minimize the effects due to thermal excursions. This is particularly true with respect to misalignment between the reticle axis and VAC body and axis. The body axis of the VAC is defined by a line scribed into the bottom of the VAC case interior at the time of manufacture. This misalignment is eliminated in the fabrication characterization only if this misalignment remains fixed. The mechanical structure of the present invention is designed so that the misalignment is thermally invariant within the desired accuracies.

Figure 11:
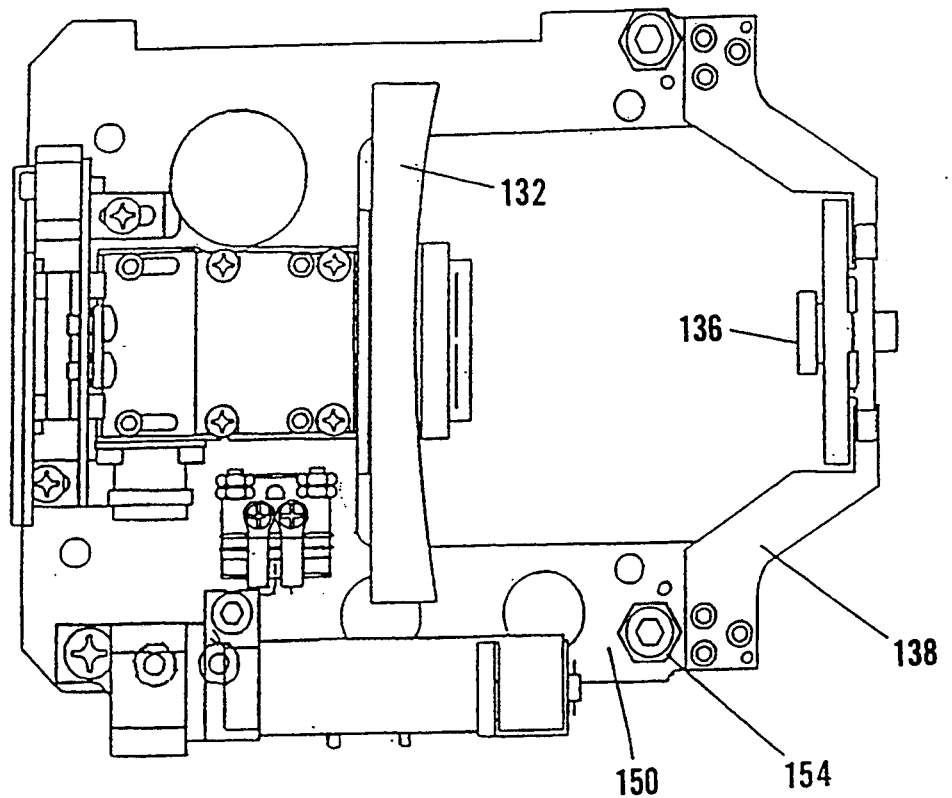
FIGS. 11 and 12 are top and side views respectively, of the VAC mechanical structure and optical components.
Figure 12:
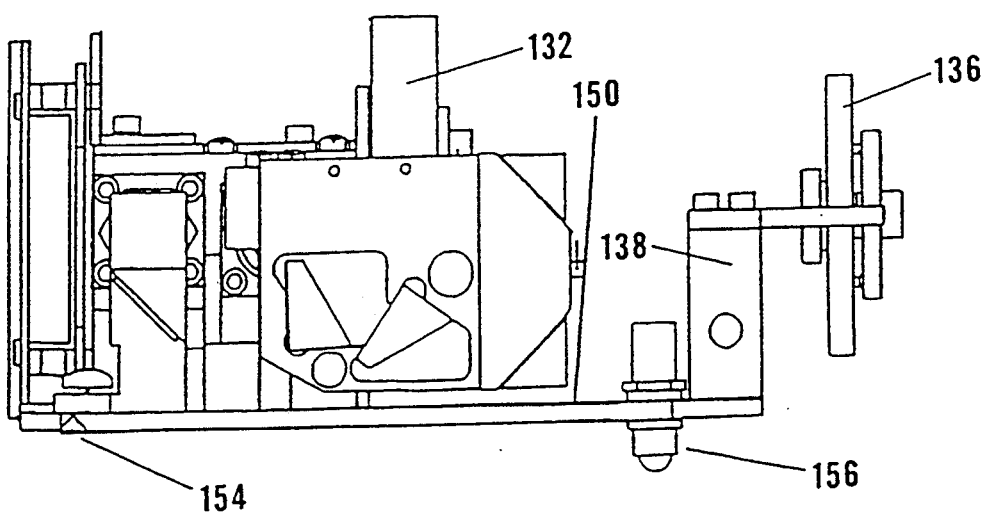

The VAC of the present invention is built in accordance with a thermal compensation design comprising a floating optical mounting plate 150 made of invar steel, as shown in FIGS. 9-11. FIGS. 11 and 12 show partial top and front views, respectively, of the VAC mechanical structure for illustrative purposes. Optical mounting brackets such as the sensor mounting bracket 144, the secondary mirror holder 136 (FIG. 9), the beam splitter mount, the laser mount, the cube mounts, and the reticle mount are also made of invar. The primary and secondary mirror substrates are preferably made of Zerodur. Both invar and Zerodur have low thermal coefficients of expansion. A ball pivot socket 152 and differential screws 154 (FIG. 12) allow mechanical alignment of the reticle axis to the aluminum VAC case during the manufacturing assembly. Because all optical components are mechanically referenced to the center line of the VAC case through the invar, the expansion of the aluminum case will not affect alignment of the optical components. Additionally, no single piece of aluminum and single piece of invar are joined at more than one point. This prevents any bimetal warping of the optical structure.

The two-axis gyroscopes 96 and 98 (FIG. 8) are preferably dynamically tuned gyroscopes ("DTGs"). A DTG utilizes spin assembly flexure mounts for torsional isolation, and has magnetic pick-offs and torquers in two sense axes. The DTGs 96 and 98 are mounted on the top and bottom, respectively, of the VAC and are used to measure the inertial angular movement of the BIU. In order to minimize gyroscope cost, the gyroscopes are operated within their compensable errors, rather than using gyroscopes with significantly more stringent specifications and capable of operating with parameters much larger than the errors. Initial gyroscope calibration and the start-up characterization help compensate for the G-insensitive, G-sensitive, and turn-on repeatability with each gyro.

In accordance with the present invention, a gimballed platform is provided which comprises the gyroscopes mounted on the VAC, a gimbal (not shown), the gyro motor circuitry torquer motors 110, 112 and 114, and stator and rotor controls 104, 106 and 108 for the roll, pitch and yaw axes.

The gimbaled platform allows rotation of the VAC in three axes. The gimbal is statically balanced in order to eliminate any static torques. It uses low friction, high quality ball bearings to ensure smooth operation. As will be described below in connection with a Gimbal Internal Loop, angular position pickoffs from the gyroscopes 96 and 98 are amplified and filtered by the gyroscope/gimbal interface 102 and an inertial circuit 160, and processed by a DSP 162, as shown in FIG. 8, in order to drive the gimbal platform torque motors 110, 112 and 114 and keep the platform stable in absolute inertial space.

As will be described in connection with the floating Gimbal Position Loop, the gimbal drive system comprising the torquer and various sensors (i.e., the gyroscopes, gyroscope measurement boards 166 and 168, the stator and rotors 104, 106 and 108 for the three axes, and a second DSP 170 to read the position of the synchro position sensors) operates to control and point the three-axis gimballed VAC to the desired orientation within the required accuracy based on the commands generated by the BIU controller 116 and the System Controller 68.

With continued reference to FIG. 8, the DSP facilitates handling of different characteristics and real time mode switching. The gyroscope/gimbal interfaces comprises drivers for an AC spin motor associated with both gyroscopes, the AC reference voltage for the gyro pickoffs, as well as for monitors such as gyro temperature, spin motor speed, etc. The gyro measurement boards 166 and 168 are in the Platform Stabilization Loop for 30 seconds and then are electronically exchanged for a second set. During the 30 seconds when they are not in the circuit, their bias and gain are measured and stored.

Thirty seconds later when they are reinserted into the Platform Stabilization Loop, their new values for gain and bias along with a rate of change for the bias and gain are used. This background calibration continues for the two boards associated with each gyroscope in the BIU and the CMIR during the entire alignment procedure.

A gyroscope measurement board 166, 168 consists of two independent rate measurement circuits, one for each gyroscope sense axis. Thus, each Gyro Measurements Board provides the measurement circuitry for one gyro in the system of the present invention. There are four boards in the system that provide rate measurements for the 8 axes of the 4 gyros used in the system.

Figure 13:
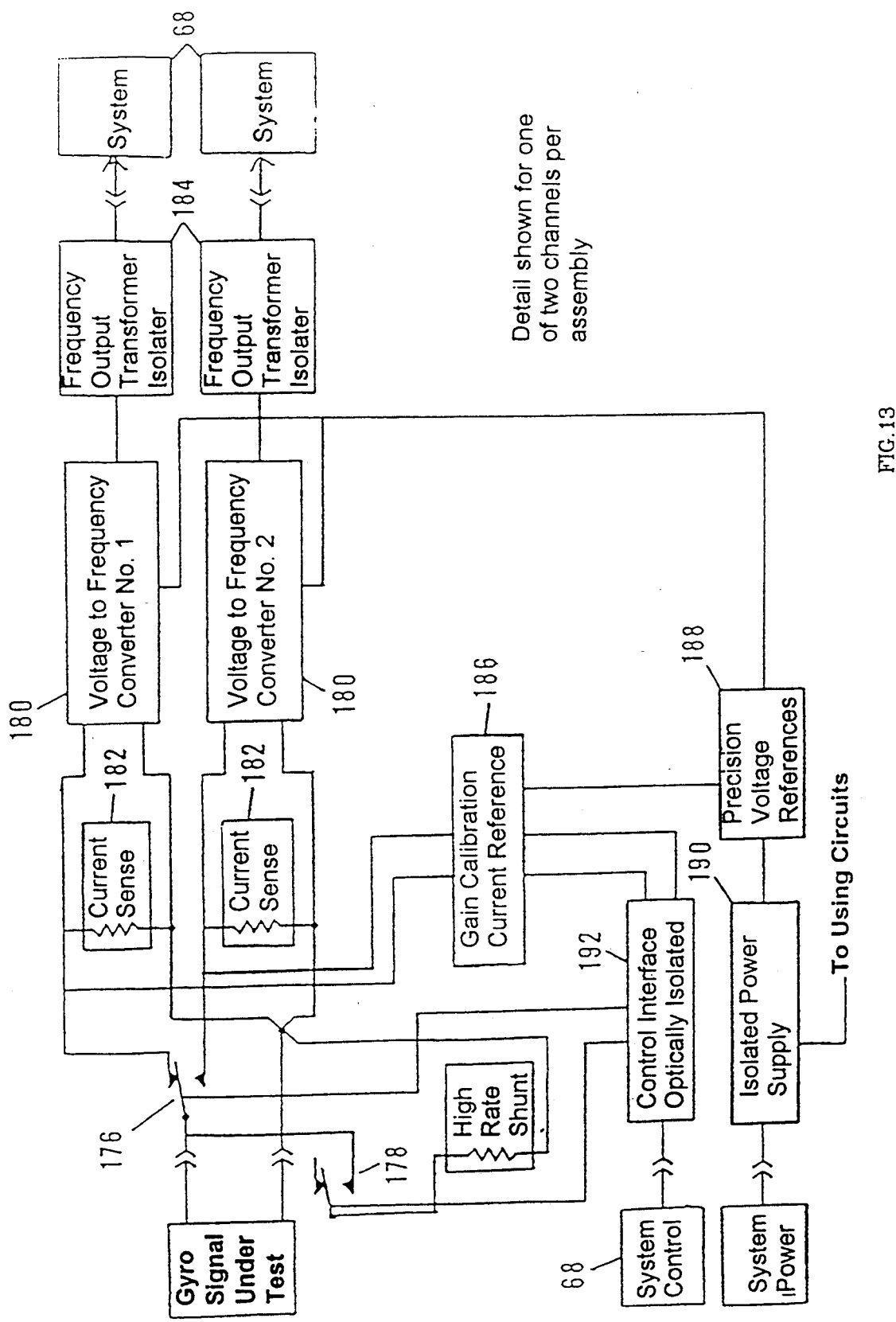
FIG. 13 is a schematic view of one of two channels in a gyroscope measurement board constructed in accordance with the present invention.

Each measurement circuit consists of two parallel measurement channels. The two channels are functionally identical, and are used for self-alignment and measurement on an interleaved basis. A single channel is depicted in FIG. 13. Channel assignment between the measurement and alignment functions is controlled by a channel assignment relay 176. When a channel is assigned to the measurement function, it can be operable in two modes: low and high rate (gyro scale factor). Mode selection is controlled by a high rate shunt relay 178.

During the measurement cycle (7.5 seconds), a voltage-to-frequency (V-F) converter 180 transforms the voltage generated across a gyro current sense resistor 182 by gyroscope torquer current to a frequency centered around 500 kilohertz (full scale is 0 to 1,000 kilohertz). Each channel has its own current sense resistor to which the gyro can be connected. This signal is sent to the System Controller 68 via an isolated frequency output transformer 184. The counts are accumulated in the System Controller every contiguous 2.5 periods. The number of counts for each accumulation period is multiplied by a calibrated gain and offset by the calibrated bias to produce an accurate value for the torquer current.

During the self-alignment cycle (5 seconds for gain calibration and 2.5 seconds for the bias calibration), the current sense resistor 182 is disconnected from the gyro. The V-F accumulated counts at zero current are collected and a new bias is calculated by the System Controller. A calibrated current from a gain calibrator current is passed through the current sense resistor 182 and a gain value is calculated. The gain calibrator current reference is provided with precision voltage references 188 from an isolated power supply 190. These bias and gain values are stored from cycle to cycle in order to determine a rate-of-changes in the values. An algorithm described below then calculates the calibrated bias and gain values to be used during the next measurement cycle of this channel.

There is a 3.5 millisecond reference circuit worst case uncertainty during the channel transition from measurement to self-alignment (and from self-alignment to measurement). In order to ensure that no data is lost during the transition periods, the value for torquer current used in rate measurements for the two integration periods immediately following a channel reassignment is the sum of the torquer current values calculated for each channel. One of the key features of the auto-alignment-/measurement circuitry is that the circuit has a floating ground and is electrically isolated from the rest of the ABE electronics by opto-electric couplers 192 and transformers 184. This enables accuracies of one part in $10^7$.

B. CMIR

Figure 14:
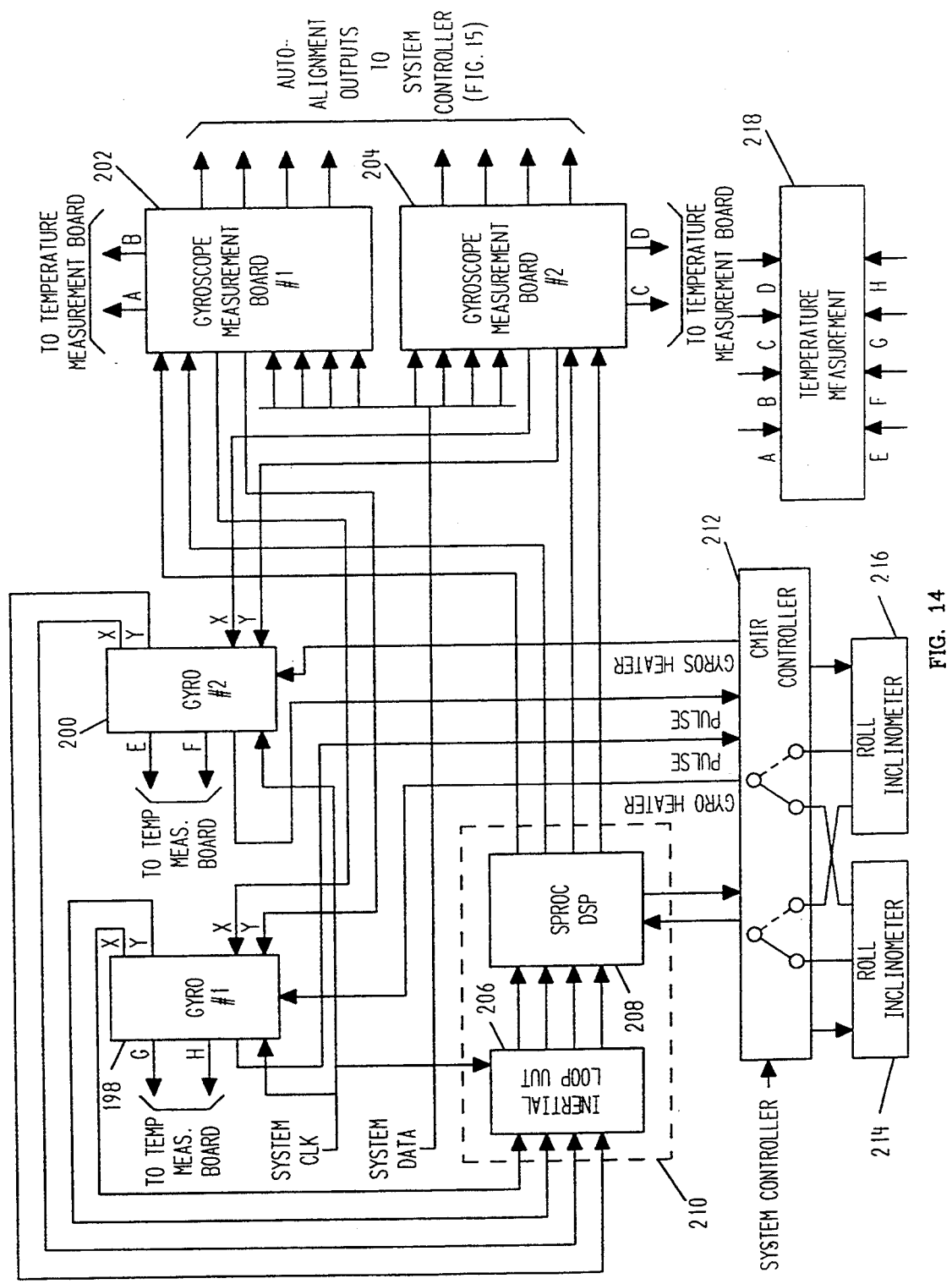
FIG. 14 is a schematic diagram of a CMIR constructed in accordance with the present invention.
Figure 15:
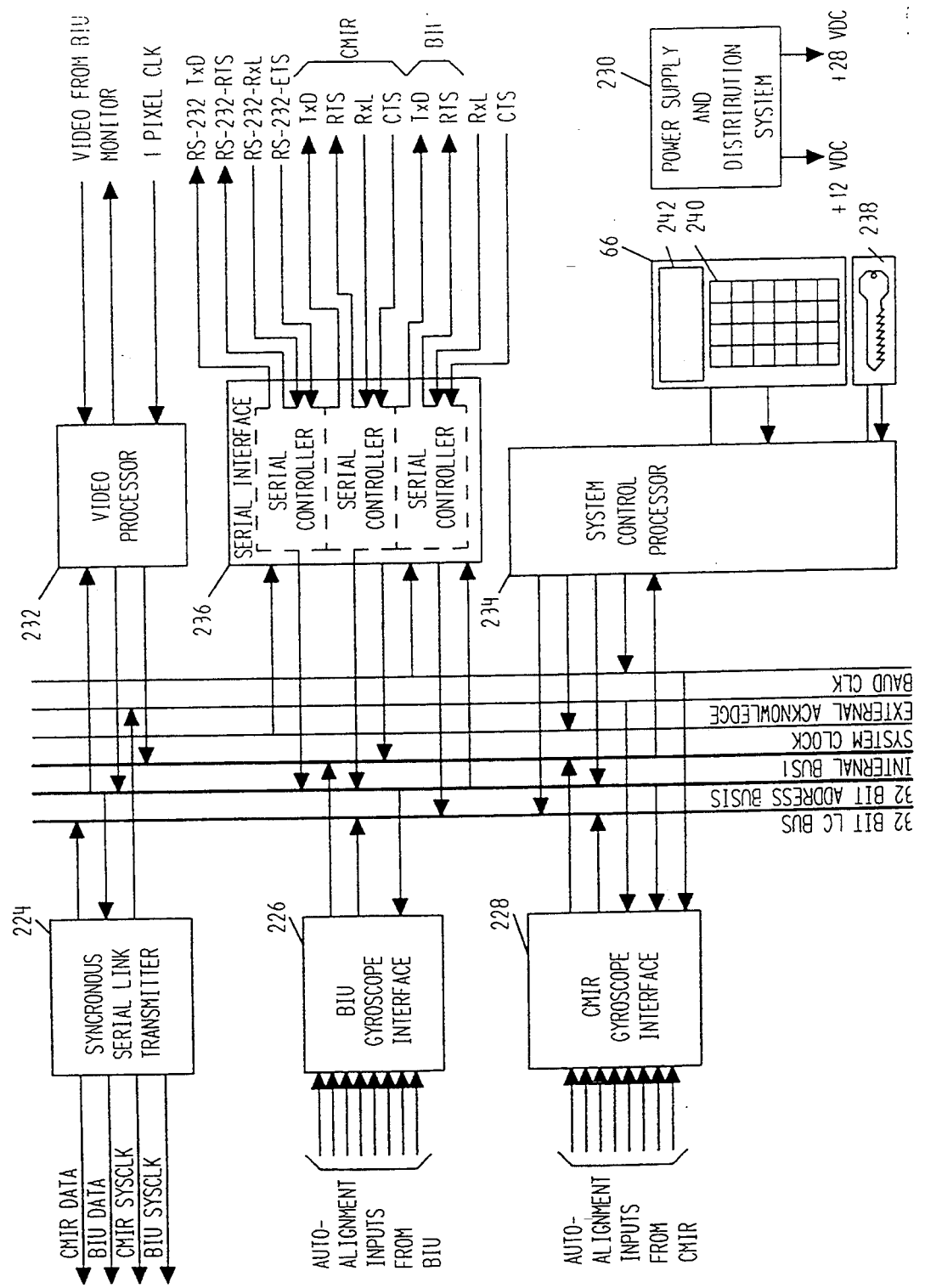
FIG. 15 is a schematic diagram of a System Controller constructed in accordance with the present invention.

The CMIR 60 is basically a subset of the BIU. The CMIR includes two DTGs and their associated electronics. The CMIR system block diagram is shown in FIGS. 14 and 15. The gyroscopes 198 and 200, their corresponding gyroscope measurement boards 202 and 204, the Inertial Loop circuit 206 and the DSP 208 are essentially the same as the gyroscopes 96 and 98, the gyroscope measurement boards 166 and 168, the Inertial Loop circuit 160 and the DSP 162 used in connection with the BIU to maximize design commonality. The distinction is that the CMIR gyroscopes are permanently strapped down to the CMIR case. Thus, there is no gimbal in the CMIR. The gyroscope control electronics board 210 comprises the Inertial Loop circuit 206 and the DSP 28. The CMIR also comprises a CMIR controller 212. The operation of these components is explained in further detail below in connection with the system software. The CMIR also contains inclinometers 214 and 216 to support calibration of G-sensitive drift, which is done in the System Controller 68. The gyroscopes are heated to a single temperature in accordance with signals from the CMIR controller 212 to prevent gyroscopic drifts due to temperature changes.

In the CMIR, the mounting orientation of the DTGs is such that all four gyroscope sensitive axes (two per gyroscope) are useful to measure angular rate in any CMIR principal axis. This configuration allows a combined 4-axis to 3-axis computational conversion that minimizes the effect of gyroscopic drift, optimizes accuracy, and provides failure detection and BIT capability. Each DTG is mounted so that the spin axis lies in the roll-yaw plane at an acute angle with the roll axis of the CMIR and so that its sensitive axes have projections in all three CMIR axes.

C. System Controller

The System Controller is the main command and control point for the boresight system of the present invention. FIG. 15 is a System Controller block diagram. The System Controller comprises a system control processor 224, interfaces to the BIU and CMIR 226 and 228, respectively, a power supply and power distribution system 230, a video processor 232, a synchronous serial link transmitter 234 and a serial interface 236. The system processor is configured to control the HHDU 66 and can also be provided with a personality module 238, which is an aircraft peculiar interface module. A personality module includes aircraft specific alignment instructions, as well as the offsets needed to align all the stations on a given aircraft.

The System Controller 68 performs four primary functions. The first involves primarily the system control processor 224 to generally command and control the boresighting system of the present invention, i.e., operator interface control, Servo Loop control, video processing, BIU and CMIR interface control, serial interface control, and built-in-testing. The system processor performs the initial acquisition of the CMIR by the BIU to establish the relative orientation of each gyro set. Software associated with the System Controller 68 (described below) integrates the motions of each set of gyroscopes to determine their current orientation. The System Controller 68 then performs the necessary coordinate transformations to calculate the new relative orientations. During these calculations the CMIR is allowed to move as it may. The BIU gimbal-mounted gyroscope set, however, is commanded by the System Controller to follow the CMIR, follow the orientation of the moving BIU case, or go to a new orientation with respect to the CMIR. In each case, the commands to the BIU are the result of integrating gyroscope motions, performing coordinate transformations, and issuing of rotational commands to the BIU gimbal by the System Controller 68. The System Controller performs serial interface control by supporting hardware preferably for one dual redundant MIL-STD-1553 serial interface, one RS-232 serial interface, and two RS-422 serial interfaces. The BIU and CMIR gyroscope interfaces 226 and 228 provide serial to parallel conversion logic and interface the system gyroscopes 96, 98, 198 and 200 with the System Controller 68. The video processor receives a video signal from the VAC located in the BIU and processes the signal into digital data for analysis by the system control processor assembly.

D. Hand Held Display Unit

The HHDU 66, which is shown in FIG. 15, provides the operator interface for the system of the present invention. System commands are entered by a technician using the HHDU keypad 240 and transmitted to the system control processor 224. An HHDU display 242 provides indicators for the present operational mode, measurement results, and general system status.

The HHDU 66 preferably has twenty individual keys on the keypad. The display 242 is a wide temperature range liquid crystal display (LCD) that preferably has four rows of 14 characters, as well as seven discrete annunciators for system mode/status information.

Figure 16:
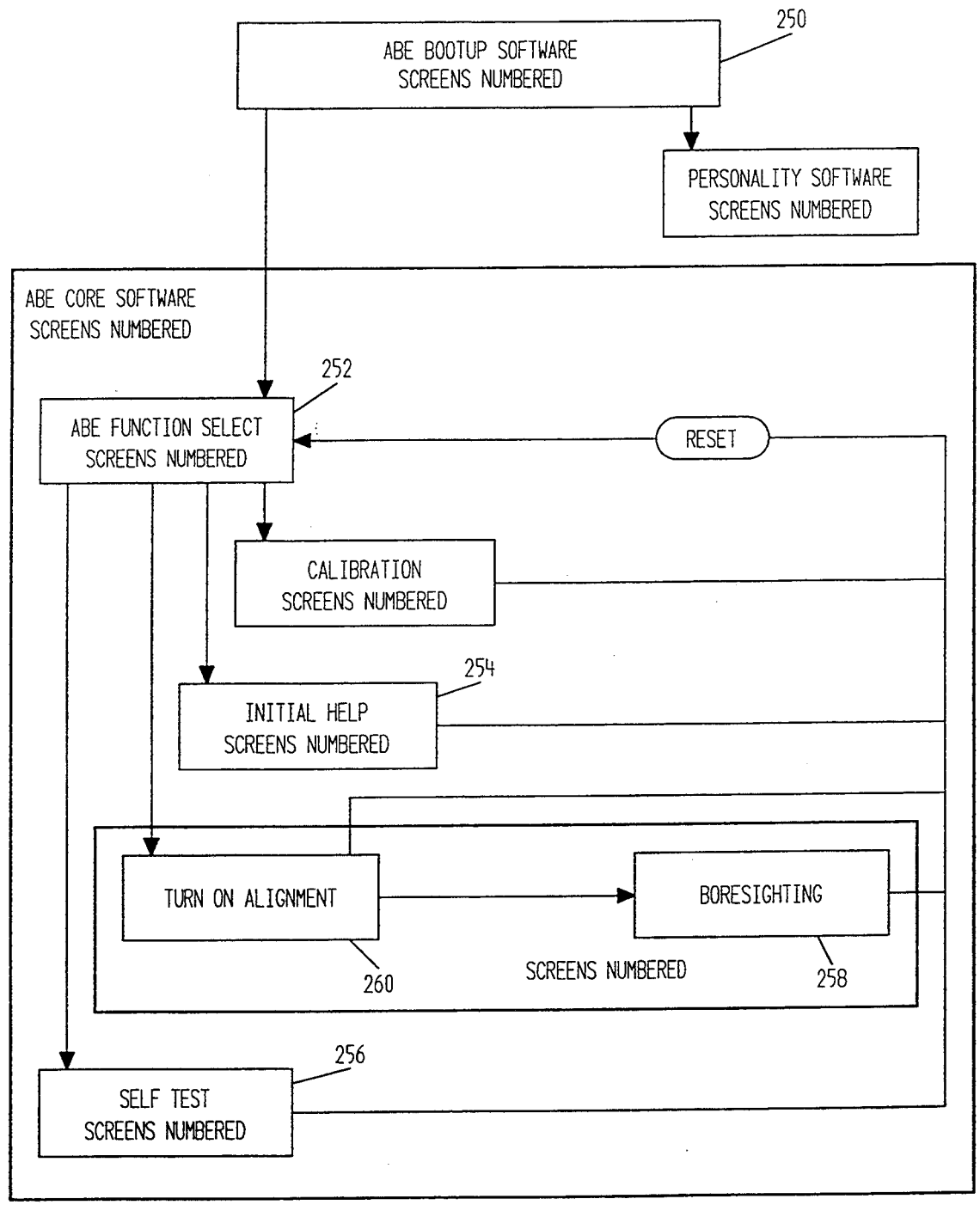
FIG. 16 is a schematic diagram of software routines associated with a System Controller constructed in accordance with the present invention.

FIG. 16 provides an overview of the system software for the present invention. Following the completion of a bootup software routine 250, the technician is queried by the system contoller 68 through the HHDU 66 to select a function in accordance with a function select routine 252.

The technician has the option of selecting an initial help routine 254, a self test routine 256 or an operational routine 258 involving turn on alignment and boresighting routines 260 and 262, respectively. The turn on alignment and boresighting routines 260 and 262 are described in further detail below in connection with FIGS. 19 through 28. With continued reference to FIG. 16, a personality software routine is also provided to give a set of device specific constants and instructions to the System Controller 68. The personality software routine is initiated prior to system operation in accordance with a core software routine, i.e., routines 252, 254, 256 and 258.

Figure 17:
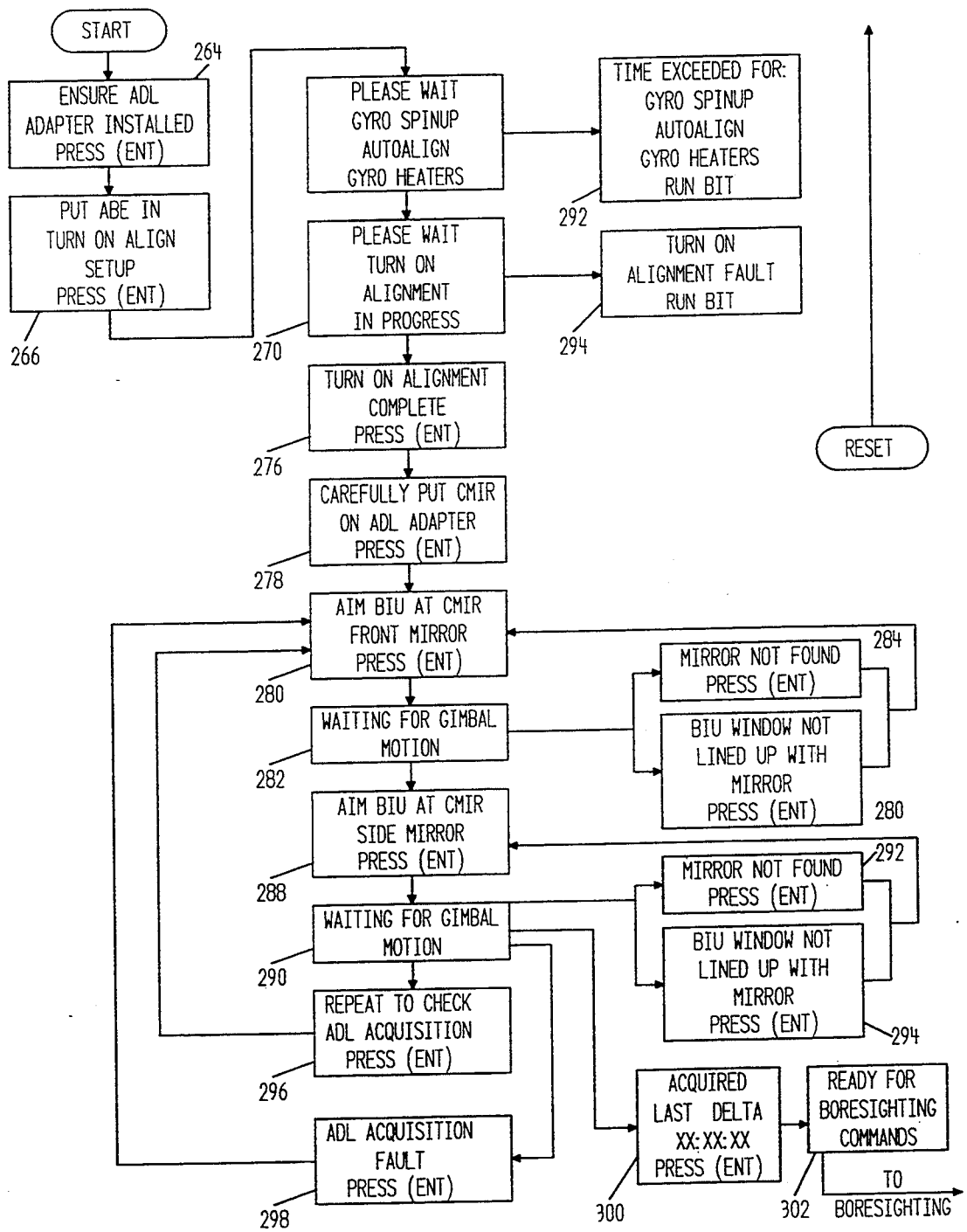
FIG. 17 is a diagram of hand-held display unit screens generated during turn-on alignment in accordance with the present invention.
Figure 18A:
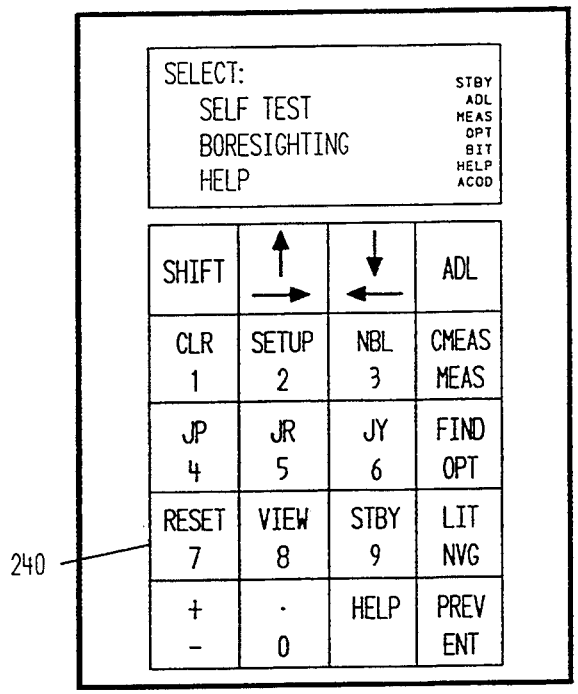
FIGS. 18A-18F are diagrams of hand-held unit and display screens generated thereon during boresighting in accordance with the present invention.
Figure 18B:
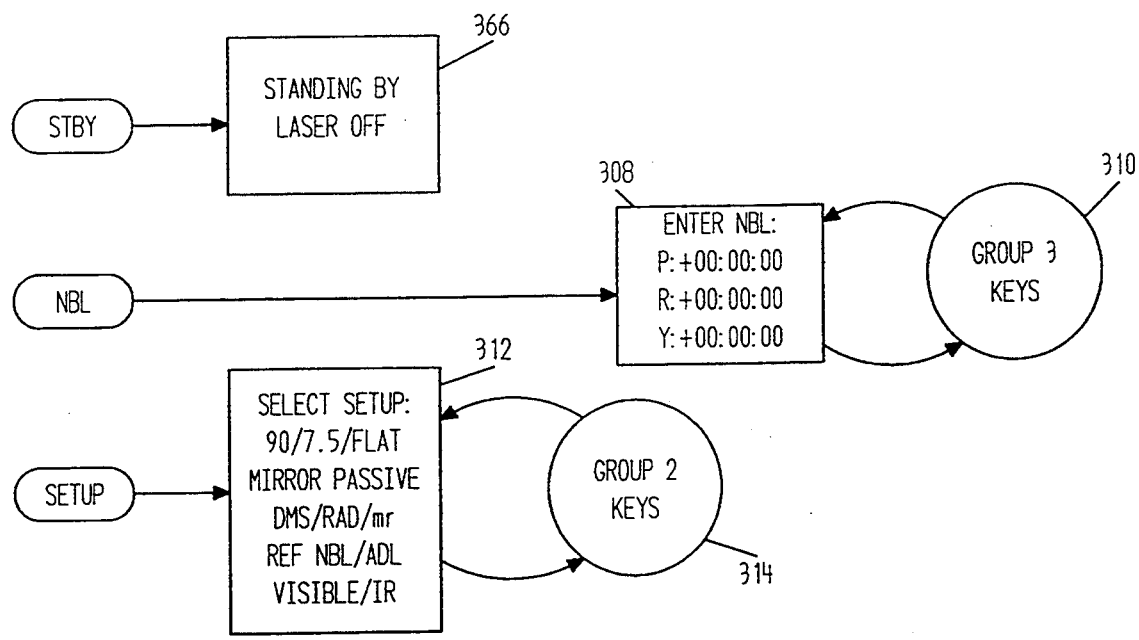
Figure 18C:
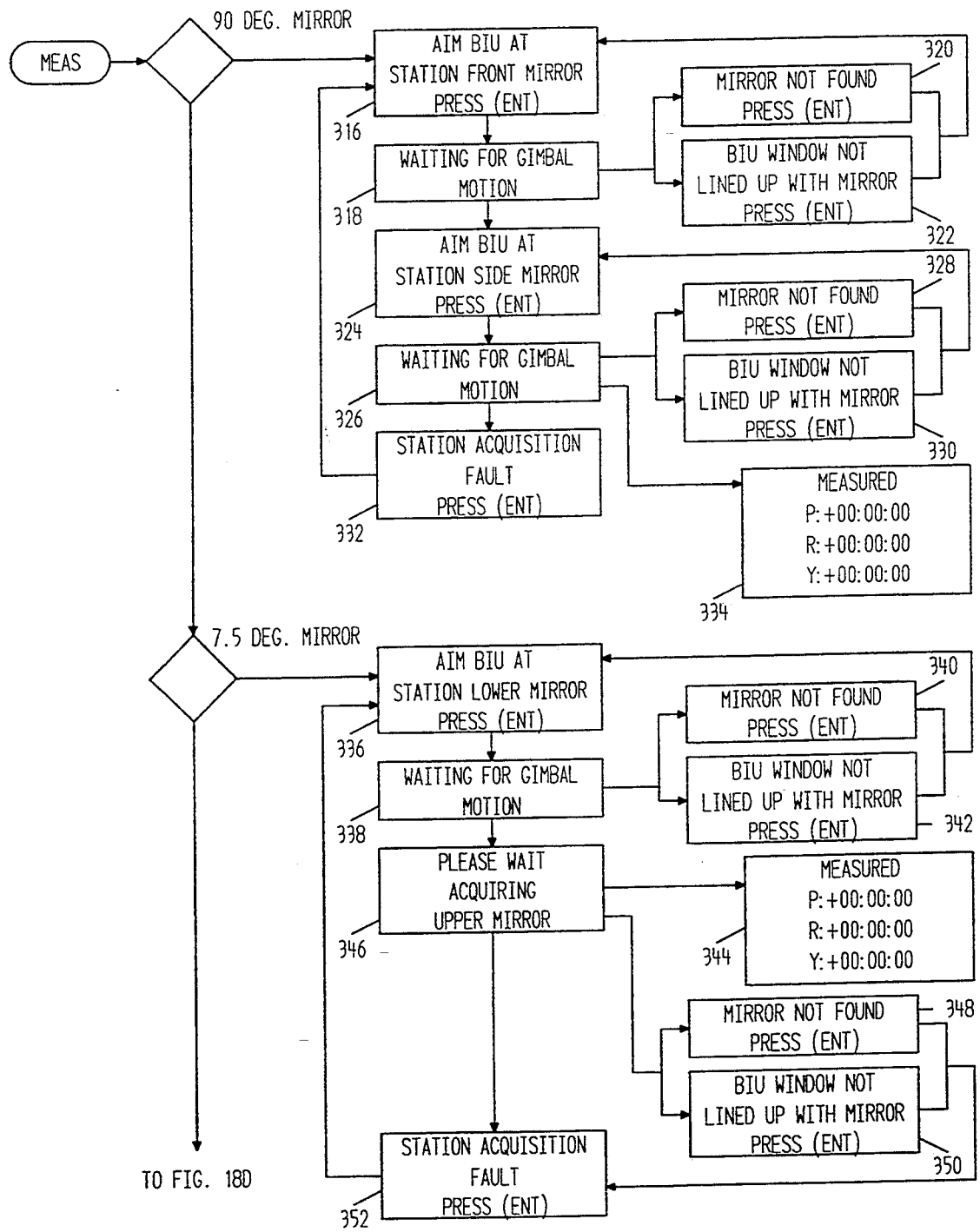
Figure 18D:
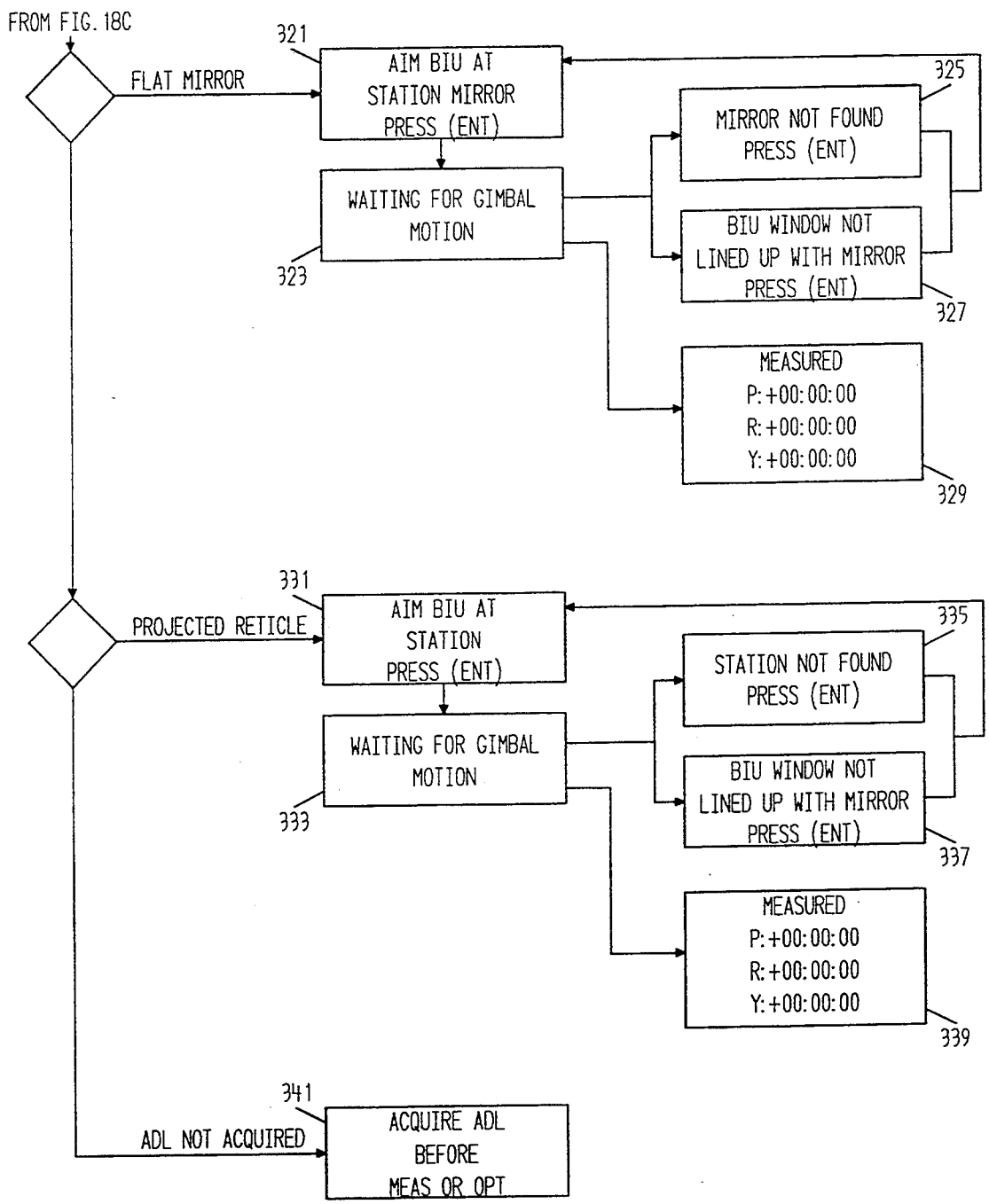
Figure 18E:
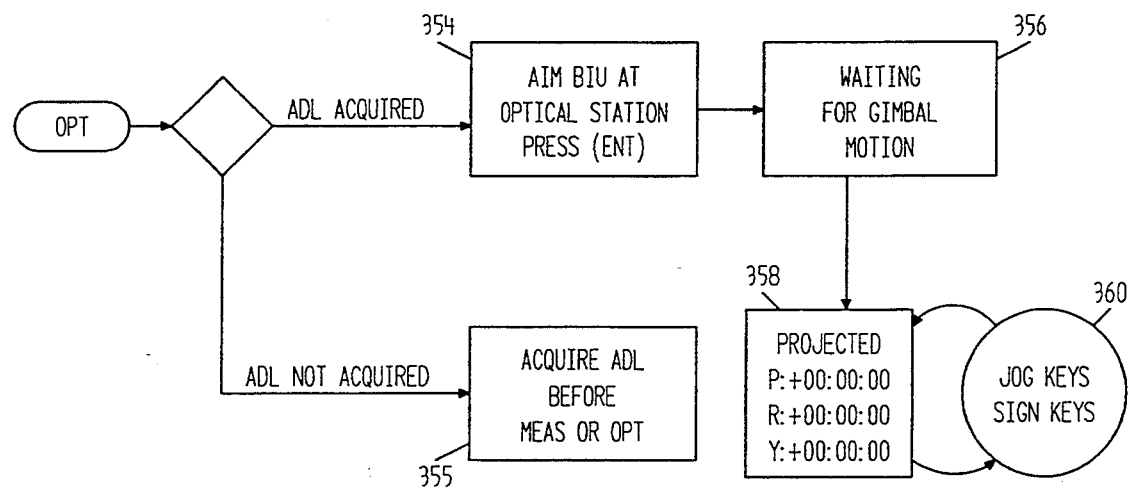
Figure 18F:
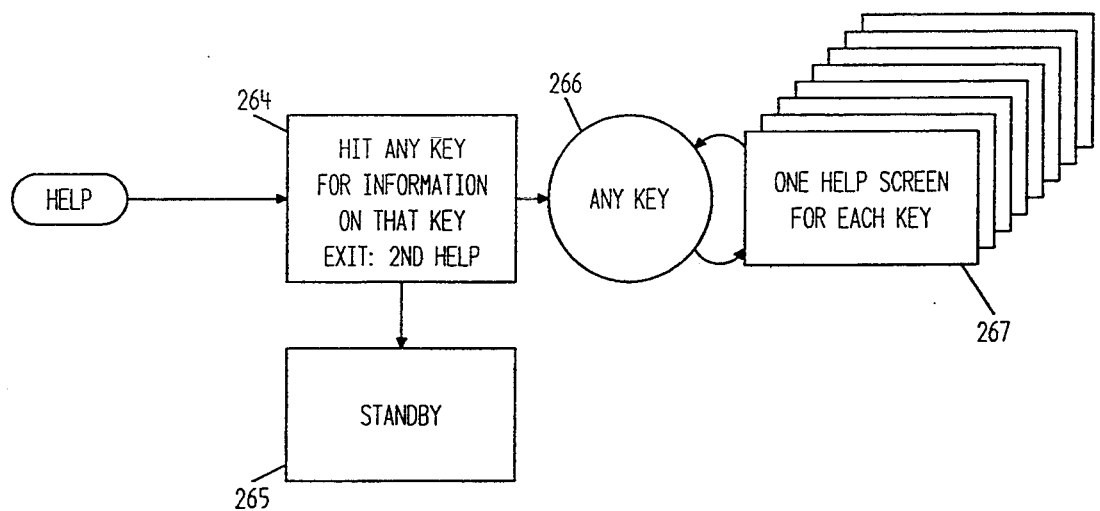

FIG. 17 illustrates operator screens provided to the technician during turn on alignment and boresighting processes. With reference to blocks 264 and 266, the technician is instructed by the HHDU 66 to insure that the ADL adapter 72 (FIG. 4) is installed and to depress a turn on alignment setup button provided on the key pad 240. The HHDU display 242 subsequently provides the technician with instructions to stand by while gyroscope spinup operations, auto-alignment, gyroscope heating processes, and turn on alignment take place. With reference to blocks 272 and 274, the HHDU indicates when a fault has occurred in turn on alignment or time has been exceeded for the gyroscope spinup, auto-alignment, or heating operations.

After turn-on alignment, the technician is instructed to place the CMIR 60 on the adapter 72, as indicated in blocks 276 and 278. The technician aims the BIU 62 and the CMIR mirror 61 at a first surface of the 0 degree mirror 84 and waits for gimbal motion within the BIU to occur as indicated in blocks 280 and 282. If the mirror is not found by the VAC or the BIU window 140 is not aligned with the mirror 61, the technician continues to aim the BIU at the CMIR front mirror; otherwise, the technician can proceed to aim the BIU and the CMIR at the second mirror surface of mirror 61, as indicated by blocks 284, 286 and 288, respectively. As shown in blocks 290, 292 and 294, the technician waits for gimbal motion to occur. If the mirror 61 is not found or the BIU window 140 is not lined up with the mirror, the technican continues to aim the BIU at the second surface of the CMIR mirror 61. As indicated in block 296, the technician repeats the process of aiming the BIU at the first and second surfaces of the CMIR mirror to check for ADL acquisition. As shown in block 298, if an ADL acquisition fault is indicated on the HHDU display by the System Controller, the technician is instructed to undergo the entire process of aiming the BIU at the CMIR mirror surfaces again. If no ADL acquisition fault is found, the HHDU screen displays a ready-to-proceed screen 302. The illustrated delta data screen 300 is for diagnostic purposes.

FIGS. 18A–18F illustrate various options provided on the HHDU keypad 240 and indicated on the display 242 which can be selected by a technician during the boresighting process by depressing an appropriate one or more of the keypad buttons 304. As shown in block 306 (FIG. 18B), a stand-by button ("STBY") on the HHDU keypad can be depressed by the technician when he wishes to temporarily interrupt the boresighting process. The laser 122 (FIG. 9) in the VAC is powered off during the stand-by mode. With reference to blocks 308 and 310 (FIG. 18B), a technician can depress numbered keys in order to enter a nominal boresight line (NBL). The nominal boresight line corresponds to a reference line associated with a weapon station, and may be offset a predetermined amount from the ADL. With reference to blocks 312 and 314, the technician can depress a setup button ("SETUP") from the HHDU keypad. The HHDU display 242 will prompt the technician to enter, for example, a type of boresight reference mirror 72 such as a 90 degree mirror, a 7.5 degree mirror or flat mirror, a reticle type such as a projected reticle into the station, a passive reticle generated by the VAC and relected back into the VAC, or an optical reticle. During setup mode, the technician can also enter a value for DMS (latitude in degrees, minutes and seconds), as well a choice between a nominal boresight line reference or the ADL.

With continued reference to FIGS. 18A–18F, the technician depresses a measurement button ("MEAS") on the HHDU keypad to undergo a boresighting process in accordance with his setup parameters provided in block 312. If a 90 degree mirror has been selected, the technician is instructed in block 316 to aim the BIU at a first surface of a mirror 70 provided at the station, as indicated by blocks 318, 320 and 322, and the technician waits for gimbal motion and for the mirror to be found by the VAC before aiming the BIU at the second surface of the station mirror 70, as indicated in block 324. The technician subsequently waits for gimbal motion until the mirror is acquired, as shown in blocks 326, 328 and 330. If a station acquisition fault is not found (block 332), measured pitch, roll and yaw values are indicated on the display 242, as indicated by block 334.

If a 7.5 degree mirror is used to reflect a reticle during the measurement process, the technician is instructed to aim the BIU at the lower surface of the mirror, as indicated in block 336. As shown in blocks 338, 340 and 342, the technician stands by during gimbal motion until the mirror is found, at which point pitch, roll and yaw values are provided on the display 242, as shown in block 344. The technician also stands by to acquire the upper mirror, as shown in blocks 346, 348 and 350, and to see if a station acquisition fault is indicated on the display 242, as shown in block 352. Because of the small angular difference, both mirrors can be acquired in one hand held position of the BIU case.

If roll is not needed for station alignment, a single 0 degree mirror is sufficient. When a 0 degree or flat mirror is used to reflect a reticle during the measurement process, the technician is instructed to aim the BIU at the lower surface of the mirror as indicated in block 321. As shown in blocks 323, 325, and 327, the technician stands by during gimbal motion until the mirror is found, at which time pitch, roll and yaw values are provided on the display 242, as shown in block 329.

In instances where the technician is aligning a station which is capable of projecting its own optical reticle into the VAC, the technician is instructed to aim the BIU at the optical station, as shown in block 331. The technician awaits gimbal motion and confirmation, as indicated by blocks 333, 335 and 337, and the display of pitch, roll and yaw values corresponding to the projected reticle on the display 242, as indicated by block 339.

If the technician has selected to align the BIU with a reticle projected from a reticle station, and the ADL has not been acquired, the technician will be instructed to first acquire the ADL before depressing the measurement or MEAS or the optical OPT buttons on the keypad 240, as indicated in block 341. The technician can subsequently depress jog keys and sign keys, which are represented by arrows and plus and minus signs on the keypad 240, to provide input signals to the System Controller to operate the gimbal to align the BIU with the projected reticle as indicated by blocks 354, 356, 358 and 360. If the ADL has not been acquired, the technician is instructed to acquire the ADL before depressing the MEAS or OPT buttons on the keypad, as indicated in block 355. Finally, when the help key is depressed, the technician is instructed on the display to depress the key about which function assistance is desired (blocks 362, 364 and 366), and the appropriate assistance is displayed on the HHDU display 242, The technician can subsequently return to the stand-by mode, as shown in block 368.

E. Boresight Reference Mirror

Figure 19A:
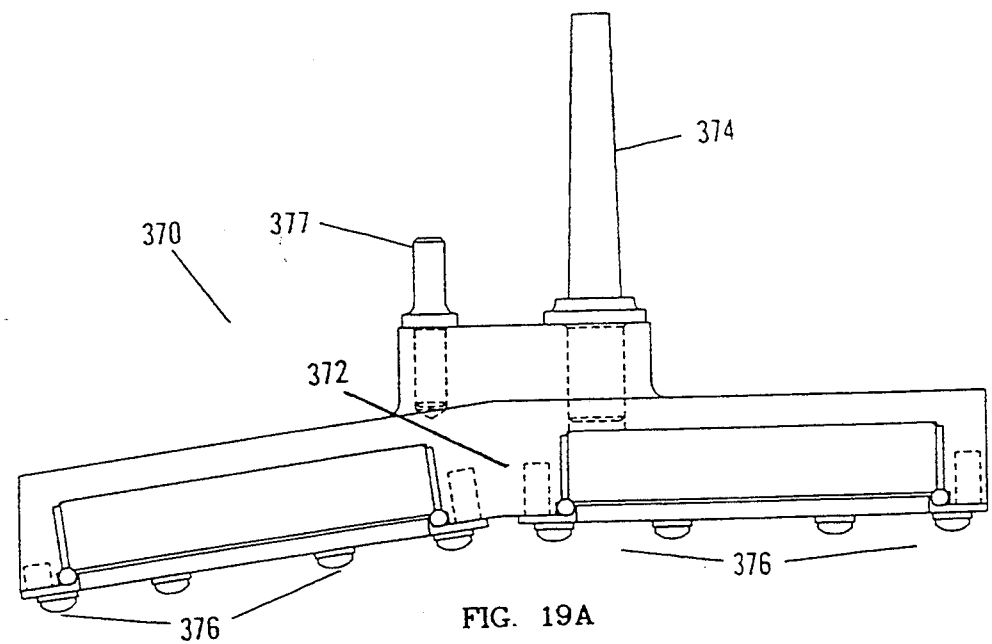
Figure 19B:
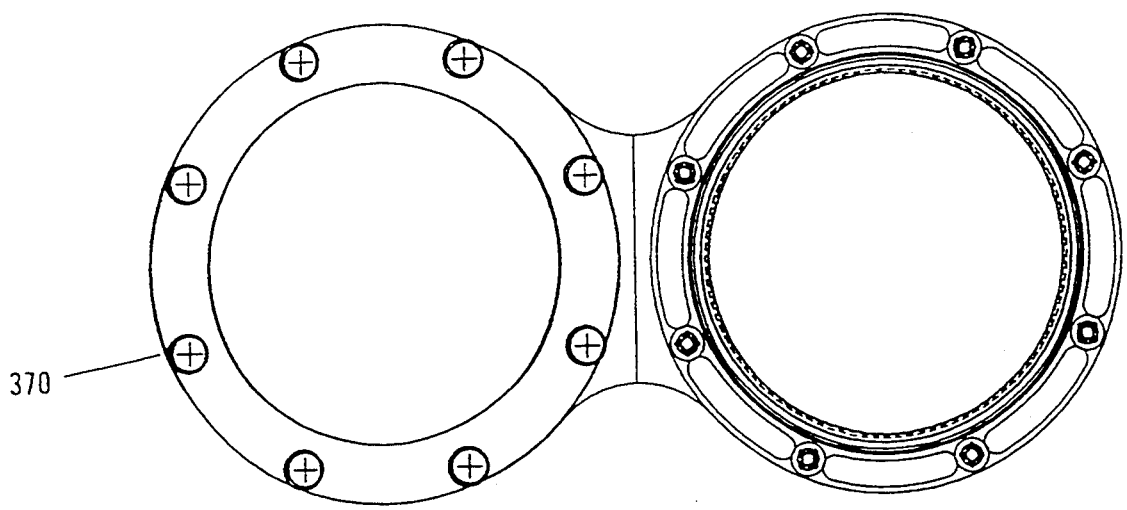

A boresight reference mirror and mount, as shown in FIG. 19, is capable of reflecting images along the weapon station axes and along an axis pitched up 7.5 degrees. The mirrored surface of the assembly is recessed to provide as much protection as possible against injury or breakage during handling and transit. The entire mirror housing 372 is machined from corrosion resistant steel with a precision integral tapered shaft 394 that provides a mechanical boresight axis. The mirror comprises differential screws 376 to adjust pitch, roll and yaw independently. Each mirror assembly 370 is fitted with a rigid pressed-in pin 377 that mates with a corresponding hole in each adapter 74 to provide a roll reference index position. FIG. 20 shows a second boresight reference mirror which reflects from the lower mirrored half 395 along the station axis and from the upper mirrored half 397 along a line pitched up 1.8 degrees from the station axis. This mirror case also has a tapered mounting shaft 399 and a roll reference pin 399a.

F. Aircraft Peculiar Adapters

The present invention can be used in conjunction with aircraft peculiar adapters necessary to interface the boresighting system with various aircraft. These adapters can be either ADL adapters or station adapters. Unique adapters can also be designed and constructed in accordance with the invention to allow the CMIR to be rigidly mounted to the ADL of the various aircraft. Similarly, adapters can be developed which allow the boresight mirror to be mounted to a passive station under alignment. This second set of adapters includes but is not limited to guns, rocket launchers, Heads Up Display (HUD) mounts, Inertial Navigation Units (INUs), radars, Angle of Attack (AOA) stations, missile launchers (TOW, ATAS, etc.), Airborne Laser Trackers (ALTs), Air Data Sensors (ADSs), pylon racks, Heading and Attitude References (HARs), and so on.

III. Software Description

FIGS. 21 through 30 illustrate Software Loops for controlling the System Controller 68, the BIU 62 and the CMIR 60 to acquire a reference line i.e., an ADL, and to boresight a station with respect to the reference line by a process hereinafter referred as platform stabilization. Gyroscope stabilization operates under three circumstances: turn-on alignment, normal operation, and extreme rotation of the BIU in order to align with some of the aircraft stations. To work under all of these conditions, two gimbal modes and two CMIR gyroscope scale factor settings are used. The gimbal modes are the Floating and Strap-Down Modes depicted in FIGS. 21 and 22, respectively. The CMIR scale factors, which were described above in connection with the theory of operation, are important for gyroscope stabilization. In the low rate range, the gyroscope may be precessed at a maximum rate of 8.88°/sec. In the high rate range, the scale factors of both the measurement and drive electronics are nominally 10 times the low rate value, but the maximum rate is limited to 65°/sec due to hardware limitations in the torquer drive circuit.

Figure 21:
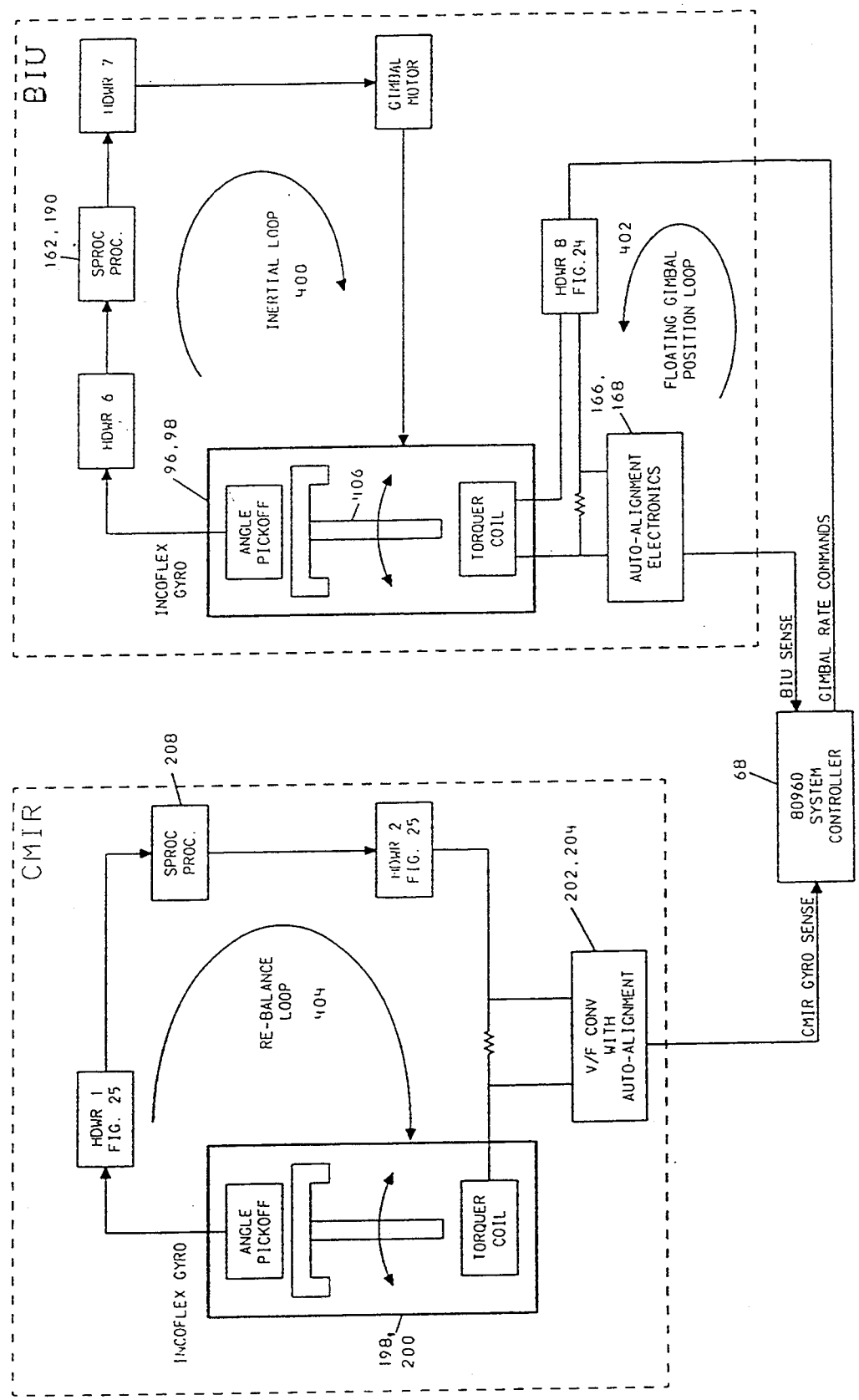
FIG. 21 is a schematic diagram of Floating Gimbal Mode Control Loops in accordance with the present invention.
Figure 22:
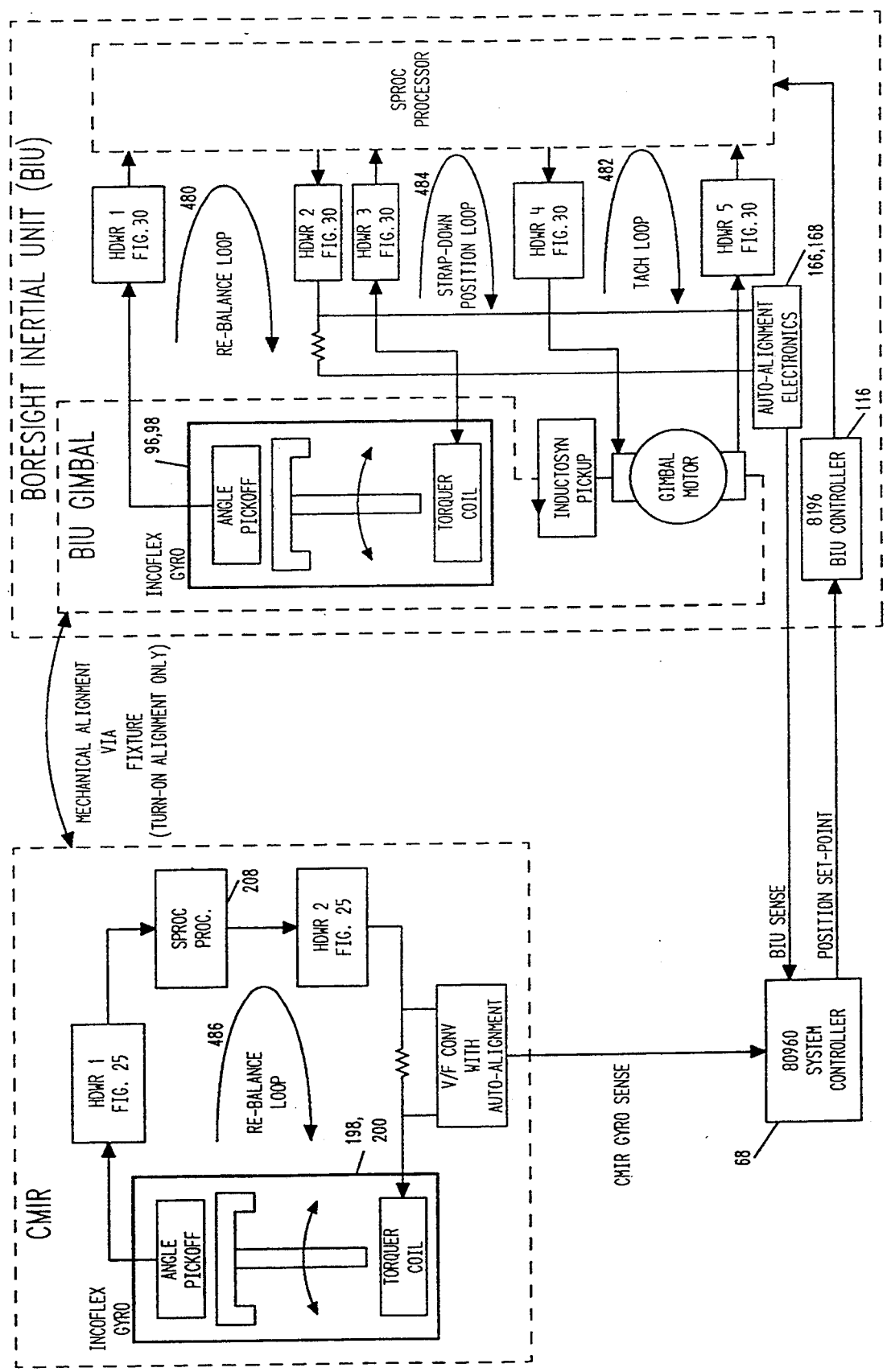
FIG. 22 is a schematic diagram of Strap-Down Gimbal Mode Control Loops in accordance with the present invention.
Figure 23:
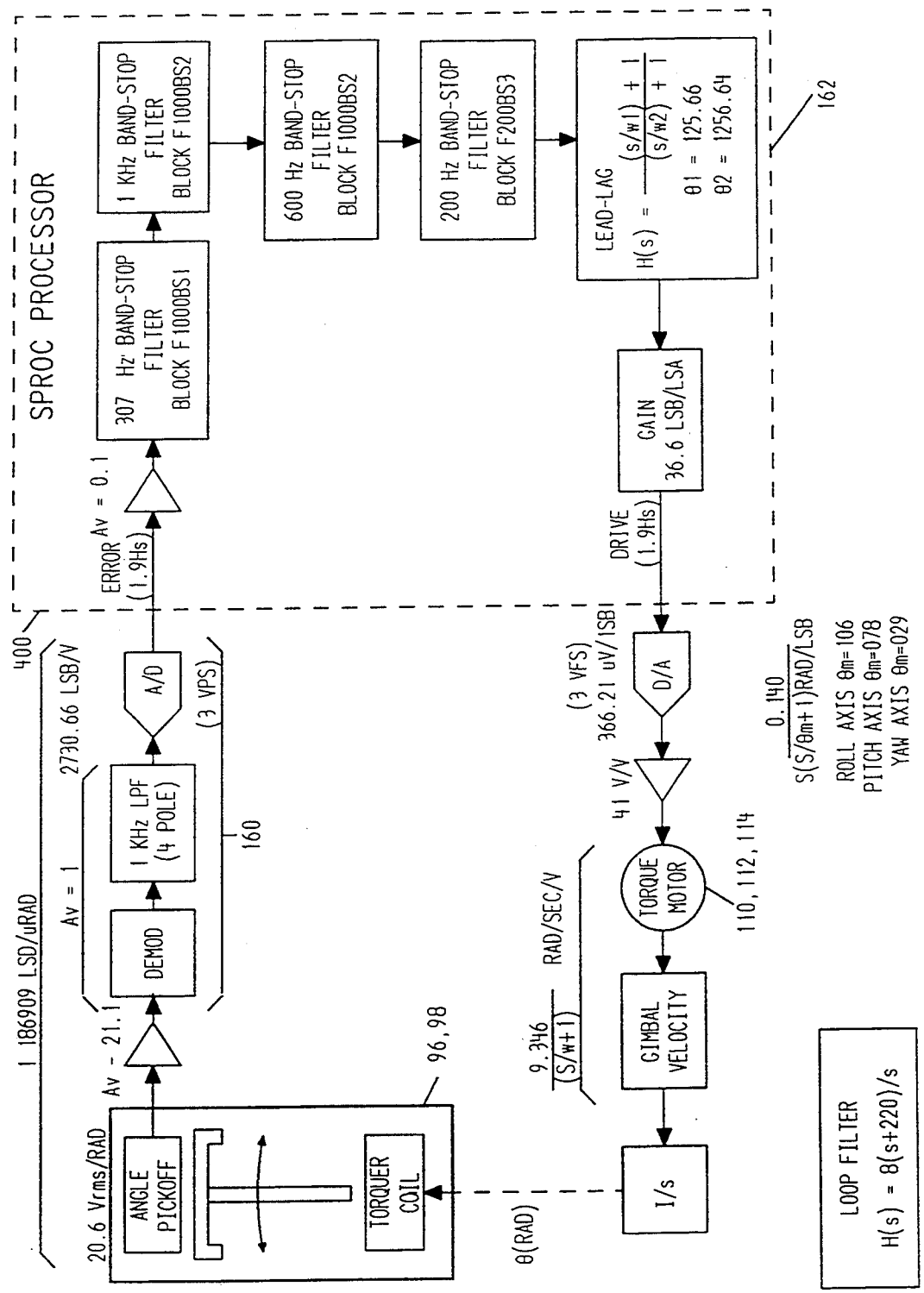
FIG. 23 is a schematic diagram of a Gimbal Intertial Loop in accordance with the present invention.

With reference to FIG. 21, that is, the Floating Gimbal Mode for platform stabilization, the BIU stabilization consists of an Inertial Loop 400 and a Floating Position Loop 402 and is used for normal operations. The CMIR stabilization 400 consists of a Re-Balance Loop 404. The Inertial Loop (FIG. 23) operates to keep the platform stable in absolute inertial space.

Physically, the spinning gyroscope shaft 406 tends to stay fixed in inertial space. This Loop 400 commands the gimbal motors 110, 112 and 114 (FIG. 8) and thus moves the gyroscope housings so as to keep the gyroscope housings centered around the stationary gyroscope shafts. The Inertial Loop is implemented in hardware, i.e., the Inertial Loop circuit 160, and within digital signal processors 162, 170 (SPROCs). System Controller software is not involved in this Loop. The BIU gyros are mounted on the gimbal and their angular position pickoffs are amplified, filtered by the DSP 162, and used to drive the gimbal platform torque motors. Band-stop filters are used to eliminate gyroscope resonances at the gyroscope spin and nutation frequencies.

The Floating Position Loop 402 (FIG. 24) operates to precess the gimbal platform/VAC assembly 94 (FIG. 8). There are three occasions when the orientation of the gimbal platform is changed during the Floating Gimbal mode: (1) when following the motion of the CMIR; (2) when performing the spiral search; and (3) when offsetting to the Nominal Boresing Line ("NBL") of an aircraft station. This Loop is primarily a software control function, in which a precession rate command is derived from the ADL and BIU platform/VAC positions, with offsets included to account for spiral search scan and the Nominal Boresight Line (NBL) of the station.

Figure 24:
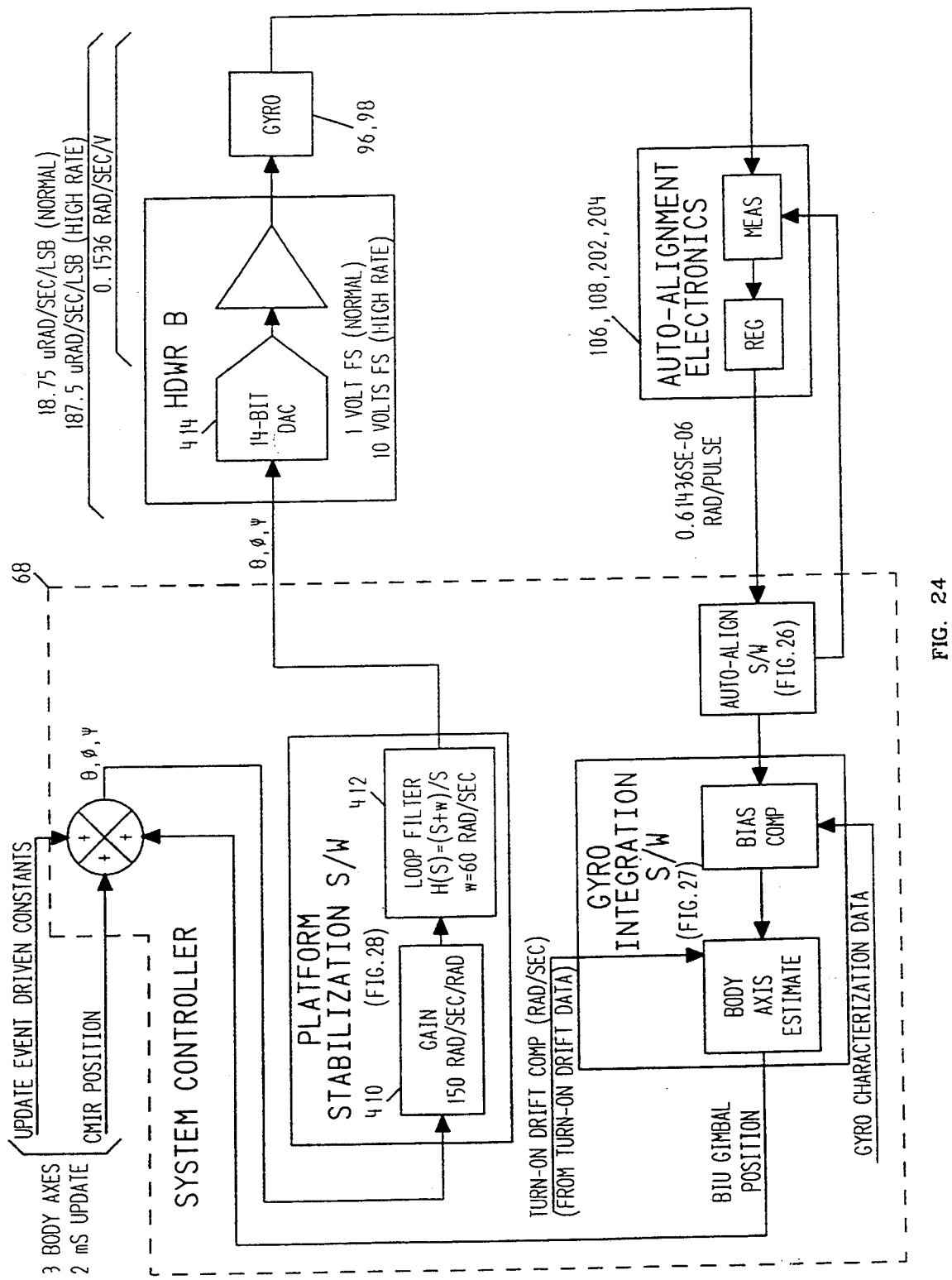
FIG. 24 is a schematic diagram of a Floating Position Loop in accordance with the present invention.

As shown in FIG. 24, the Loop is driven with position inputs on a 2 millisecond (1.953) update interval. If the Scan/Offset input is zero, the angles $\Delta\Theta$, $\Delta\Phi$, $\Delta\psi$ represent the difference between the CMIR orientations and the BIU inner gimbal orientation. These values are passed through a gain factor of 150 rad/sec/rad, as indicated by block 410. The amplified values are then compensated using a proportional plus integral Loop filter transfer function $[(s+\omega_c)/s]$ (block 412). These processes are accomplished by software within the System Controller 68. The compensated precession rate commands $\Theta$, $\Phi$, $\psi$ are output to digital-to-analog converters (DACs) 414 that control gimbal precession about the three gyroscope axes.

Figure 25:
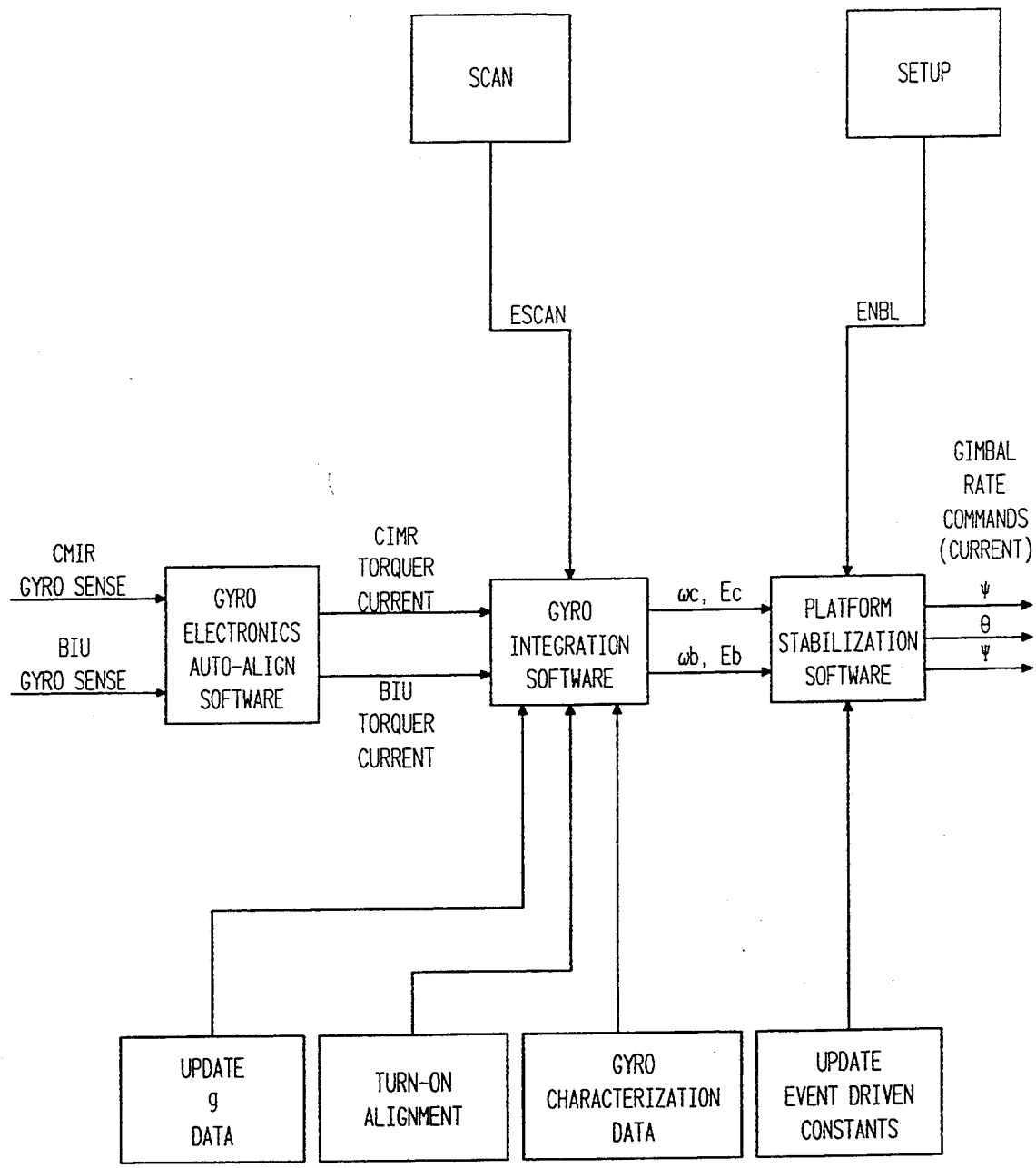
FIG. 25 is a schematic diagram of system controller software for gyro stabilization.
Figure 26:
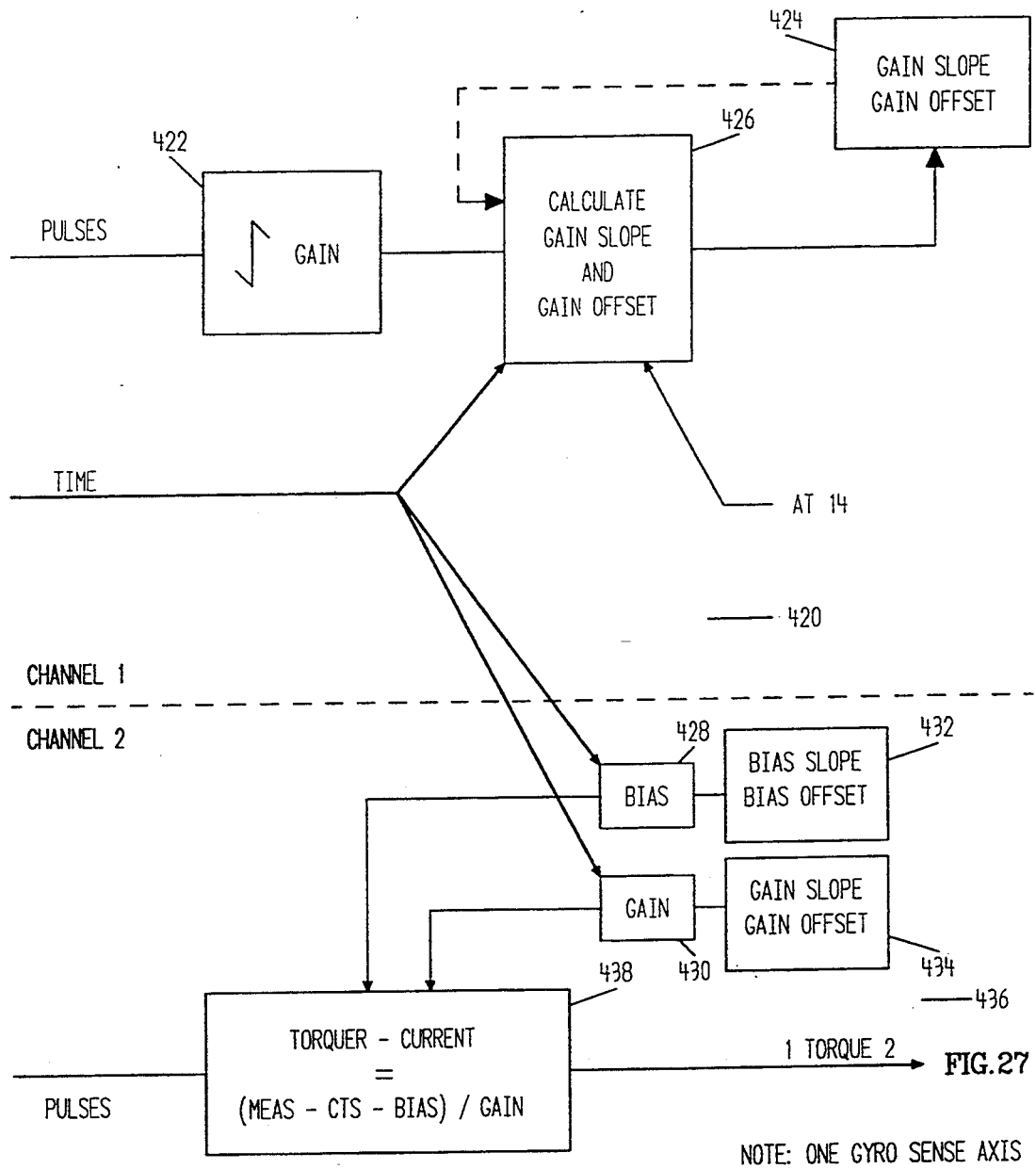
FIG. 26 is a diagram illustrating calibration and measurement functions associated with gyroscope electronic auto-alignment in accordance with the present invention.

The software implementation of Floating Position Loop 402 within the System Controller is illustrated in FIG. 25. Each block in FIG. 25 is described below in connection with FIGS. 26 through 28. The gyroscope auto-alignment software (FIG. 26) receives the output signals from eight auto-alignment electronics circuits (four in the BIU and four in the CMIR). Four circuits (two in each unit) are under calibration while the other circuits are measuring the outputs of the gyros. During the calibration cycle 420 of each circuit, the gain and bias are measured (block 422) and recorded (block 424) using a calibrated input in the circuit. These numbers are stored and a new rate of change in these numbers is calculated (block 426) after each calibration cycle. The circuits are swapped between being calibrated and taking measurements every 15 seconds. The bias 428, gain 430, bias slope 432, and gain slope 434 values are used when this circuit is swapped into the gyroscope measurement circuit 436 to calculate the CMIR and BIU torquer currents from the board outputs, as indicated by block 438.

Figure 27:
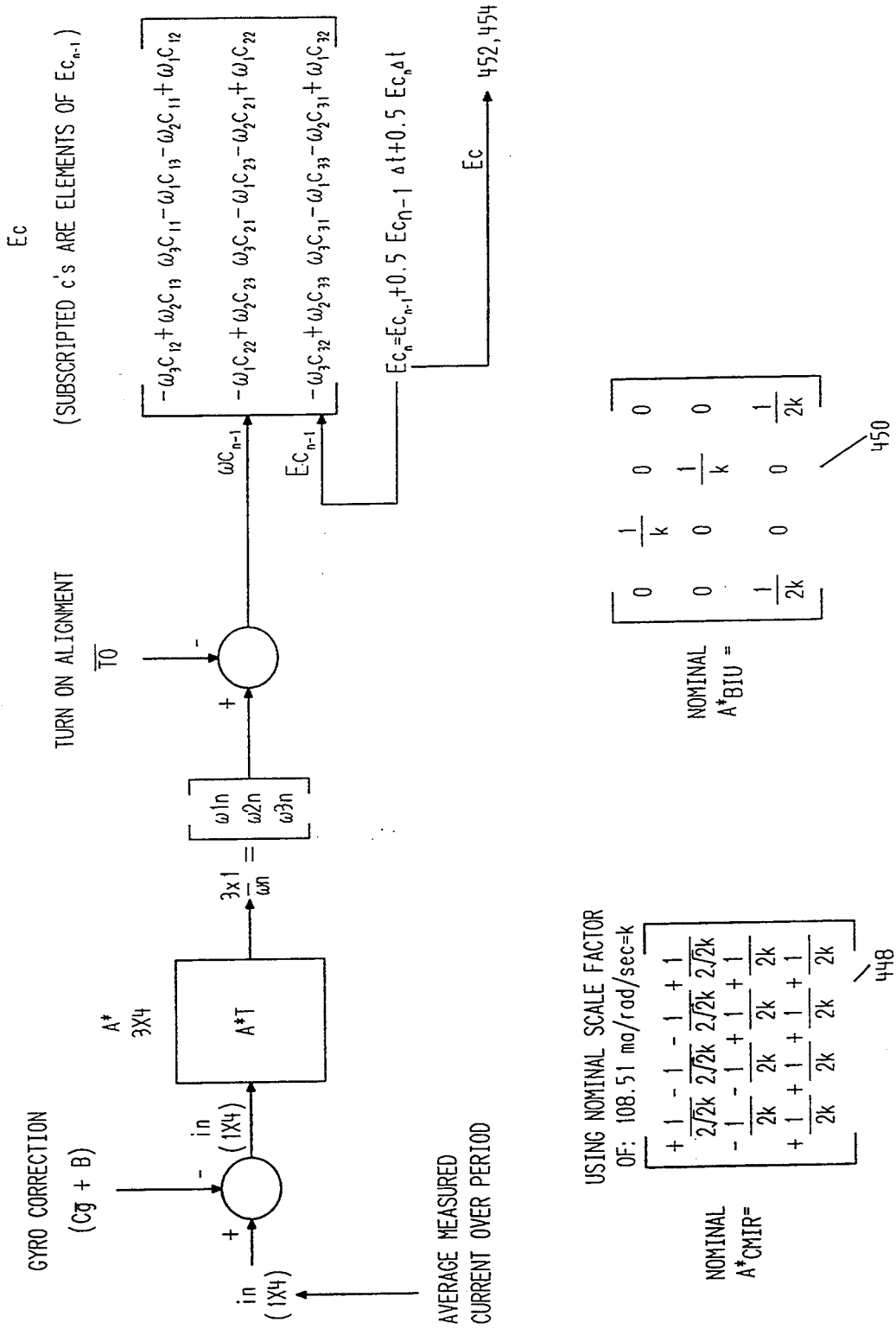
FIG. 27 is a diagram illustrating gyroscope integration software operations.
Figure 28:
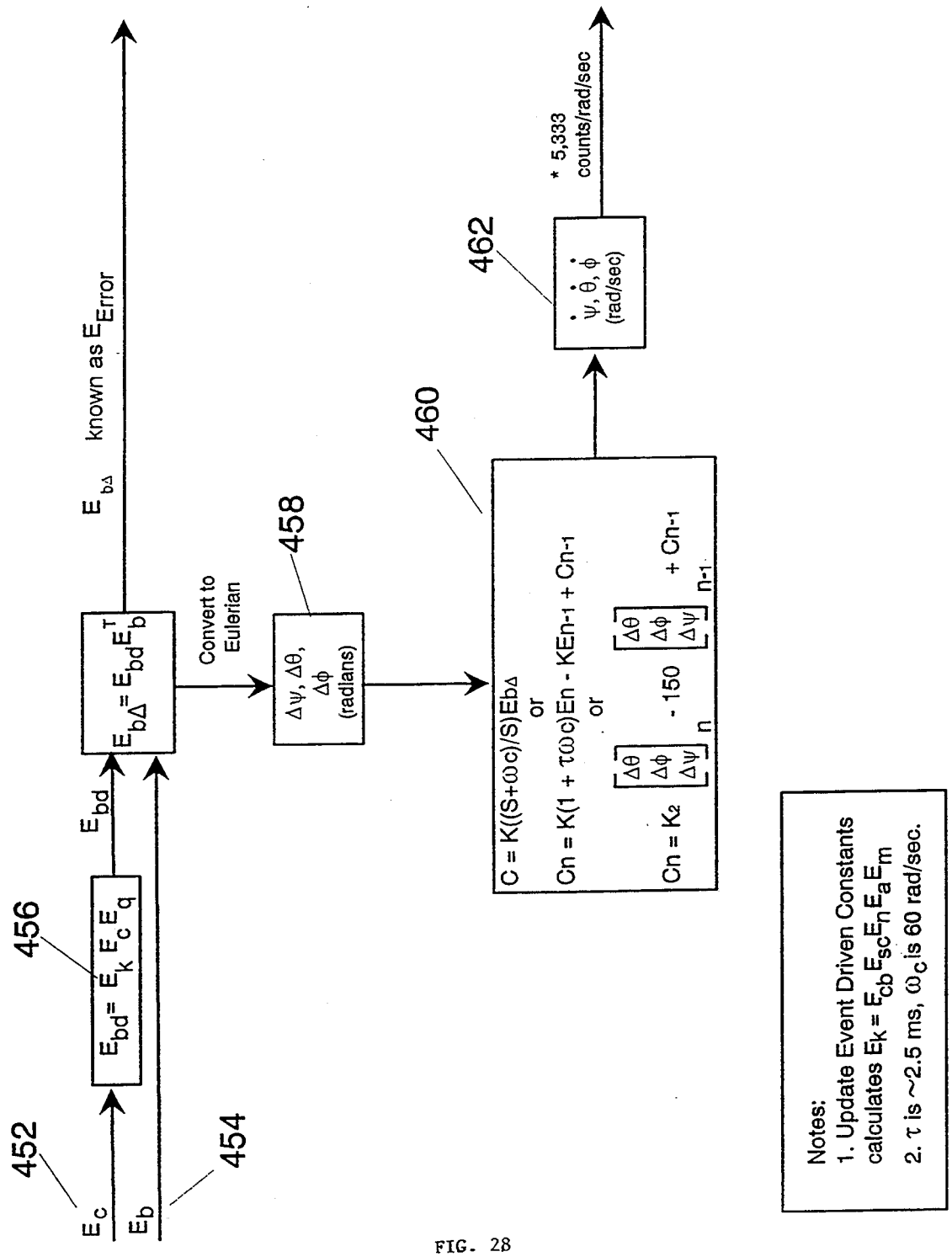
FIG. 28 is a diagram illustrating platform stabilization software operations.
Figure 29:
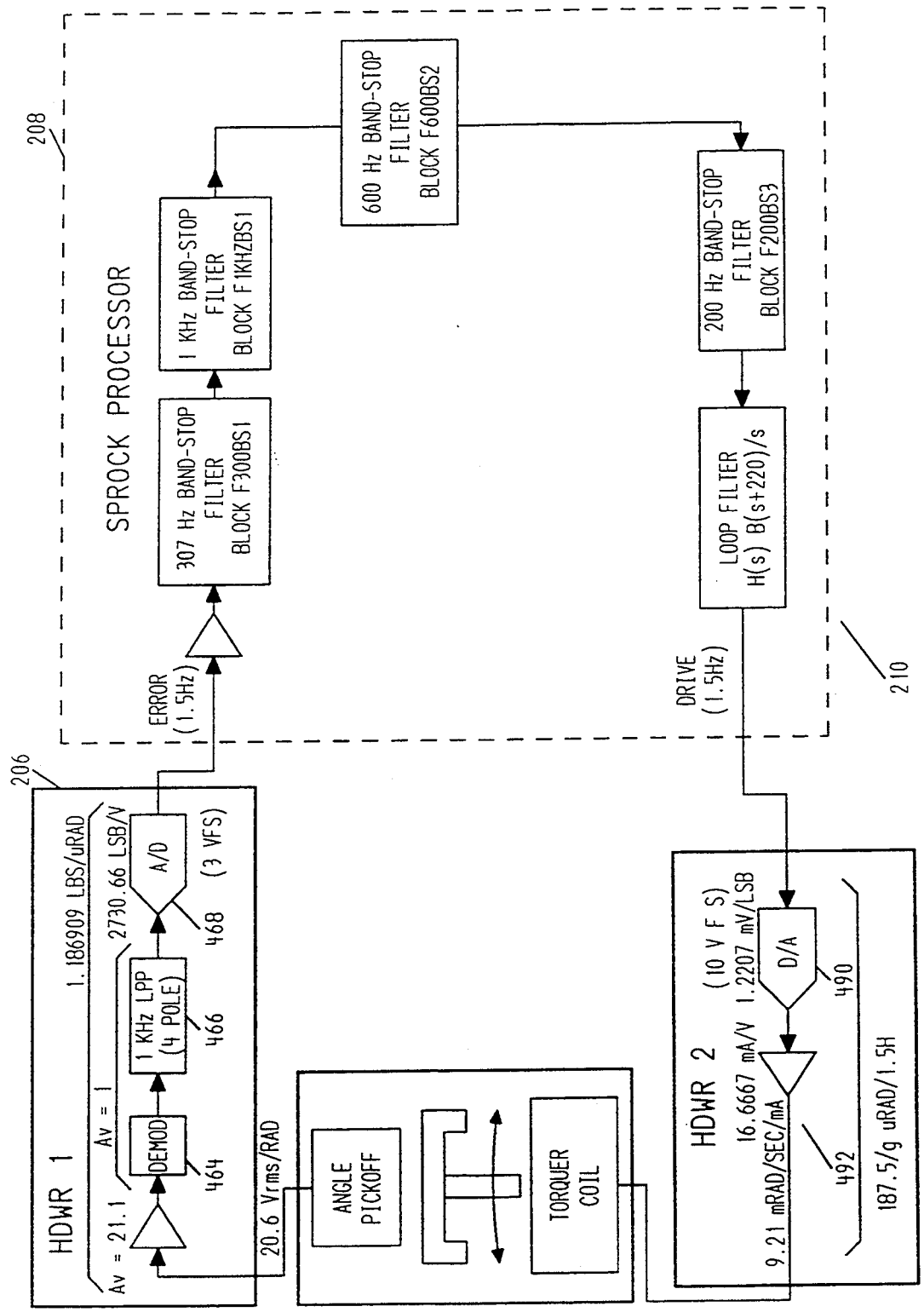
FIG. 29 is a diagram illustrating hardware components in a gyroscope Re-Balance Loop.

The torquer current values are then fed into the Gyro Integration Software (FIG. 27). As shown in FIG. 25, other inputs to this software block include: turn-on alignment data 442, gyroscope characterization data 444, and gravity orientation 446 as determined by the inclinometers 214 and 216 in the CMIR. The software uses direction cosine matrices to perform the mathematics. The calculation takes into account that the two sets of gyros are configured differently; hence the BIU and CMIR have different "A" matrices 448 and 450 (FIG. 27). The outputs of the Integration block are two direction cosine matrices $E_B$ 452 and $E_C$ 452, which relate to the accumulated rotation since turn-on of the BIU and CMIR gyroscopes, respectively.

These rotation matrices are provided to the platform stabilization software (FIG. 28) where they are combined with the event driven constants 456 (internal mechanical offsets, spiral driver constants, and NBL data) to produce an Eulerian set 458 of difference angles between the BIU and the CMIR. The last block 460 in the Platform Stabilization Software mathematically performs the gain and Loop filter functions described for FIG. 24 to finally produce angular rate outputs 462 for each of the three rotational directions. These rates are output to the BIU hardware portion of the Floating Position Loop.

The Re-Balance Loop (FIG. 29) in the CMIR operates to move the spinning gyroscope shaft in order to hold it centered in the moving gyroscope housings. Since these gyroscope housings are fixed to the CMIR body, any motion of the CMIR (such as the earth spinning) causes the gyroscope housings to move. As the gyroscope shaft is tilted over in inertial space to keep up with the CMIR, the torquing signal is read so that the amount of rotation is fed to the System Controller. This Loop is implemented in hardware comprising a demodulator 464, a low pass filter 466, a DAC 468, a DAC 470, and an amplifier 472, and in the digital signal processor within the CMIR such that no System Controller software is used.

Figure 30:
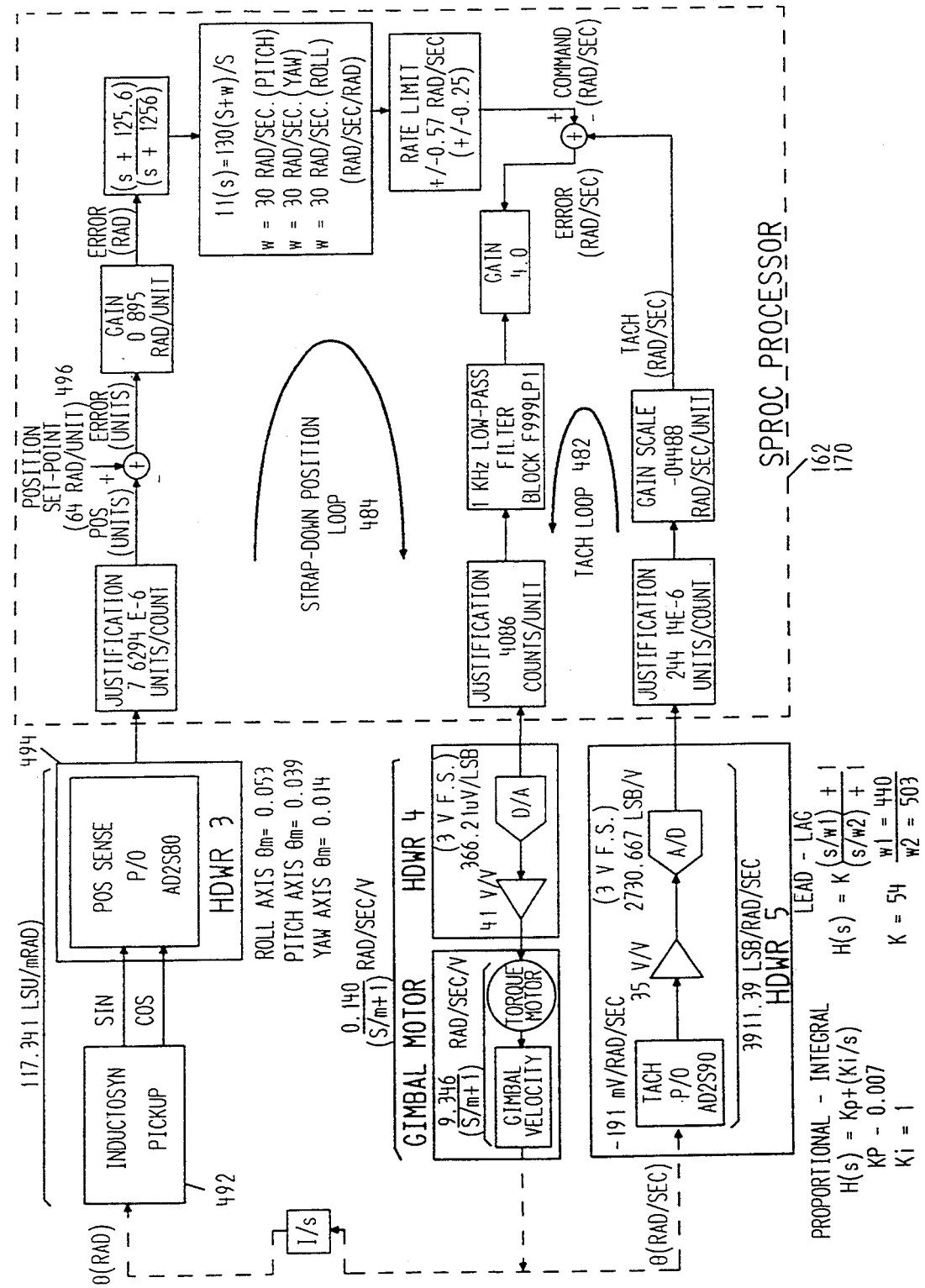
FIG. 30 is a schematic diagram of Strap-Down Position and Tach Loops in accordance with the present invention.

The Strap-Down Gimbal Mode for ABE platform stabilization is illustrated in FIG. 30. This mode is used during turn-on alignment and periods of reticle operation. In this mode, the BIU gyros 96, 98 are commanded to line up with the BIU case. The BIU stabilization for the BIU during this mode of operation consists of a Re-Balance Loop 480 (FIG. 22), a Tach Loop 482 and a Strap-Down Position Loop 484. The CMIR stabilization consists of a Re-Balance Loop 486. Both Re-Balance Loops are similar to the re-balance Loop 404 discussed for the Floating Gimbal Mode.

The Strap-Down Position Loop (FIG. 30) operates to precess the gimbal platform and the VAC 94 in time with the BIU case motion, so that there is no relative motion between the BIU case and the platform/VAC. In order to perform this task, the relative position between the platform/VAC and the BIU case is measured with Inductosynchronous position sensors 494. Three Inductosyn synchros are used, one for each axis. During the Strap-Down Gimbal Mode, each Inductosyn synchro sensor 494 is powered-up and provides a 2 arc-second rotational position reading accuracy. Although the platform/VAC is fixed relative to the BIU case in the Strap-Down Gimbal Mode, they are not always fixed at the same relative position. This is the situation during turn-on alignment where three different relative positions are used to ascertain the turn-on drift constants. The relative position is input as the position setpoint 496. Once fixed, the accumulated rotation is calculated in the DSP (162 or 170 or both) and maintained in the System Controller software.

The Tach Loop (FIG. 30) is used to stabilize the gimbal motor action as it attempts to overcome the inertia of the platform/VAC in following the motion of the BIU case; thus, this Loop is unnecessary in the floating gimbal mode because the gimbal motor does not need to overcome this inertia. The Tach Loop is implemented in the BIU digital signal processor and hardware and no System Controller software is used. HDWR 5 (500) and HDWR 4 (502) provide digital-to-analog and analog-to-digital conversion from the SPROC processor to the gimbal hardware.

The present invention can be used to boresight, for example, the weapon and navigational stations of an aircraft in significantly shorter times than possible with prior boresighting techniques. With the present invention, stations can be boresighted to accuracies at least ten times better than those previously achieved and with positive confirmation of misalignments. The present invention incorporates a single generic set of equipment that can be used on any aircraft or other vehicle or device which requires a referred alignment through the use of device-specific adapters.

The present invention not only allows the alignment of passively aligned equipment such as guns and inertial navigation units, but also virtually aligned equipment such as heads-up displays (HUDs), infrared (IR) sensors, and systems which project their own reticle.

The present invention is designed with a goal to minimize size, weight, complexity of operation, and alignment time associated with prior boresighting systems without compromising the ruggedness required for operation in adverse conditions, such as on a flightline. This goal is achieved through a system design which optimizes the use of high reliability microelectronics and software, modern control theory techniques, extensive system simulation, and meticulous computer-aided hardware design. The invention comprises such novel features as a dual gyroscope set, dual gyroscope mode operation, unique calibration techniques, unique adapter and mirror sets, background electronic calibration, and the accommodation of personality modules. The present invention also incorporates a unique common mode stabilization technique to eliminate the effect of motion of the aircraft and the boresight technician, such as ship motion, wind loading, and earth rate.

Although the present invention has been described with reference to a preferred embodiment, the invention is not limited to the details thereof. Various modifications and substitutions will occur to those of ordinary skill in the art, and all such modifications and substitutions are intended to fall within the spirit and scope of the invention as defined in the appended claims.

What is claimed is:

1. A gyroscopic system for translating parallel and non-parallel lines between a reference line and a device to be aligned with respect to the reference line, comprising:

a first inertial sensor configured to be substantially stationary and boresighted with respect to said reference line, said first inertial sensor comprising at least two gyroscopes and a mirror having first and second nonplanar surfaces, each of said gyroscopes being operable to generate an output signal;

a second inertial sensor configured to be portable so as to be positionable adjacent to said first inertial sensor and comprising a gimbal and a gimbal drive system, and an electromagnetic energy beam generator, at least two gyroscopes that are operable to generate an output signal, and a collimator, said collimator being operable to determine an angle between a beam projected by said beam generator and a beam reflected from said mirror and to generate an output signal indicative of said determined angle; and a control circuit operable to process output signals generated by said collimator and said first and second inertial sensor gyroscopes and determine relative orientations of said first and second inertial sensors with respect to each other.

2. A system as recited in claim 1, wherein said first and second nonplanar surfaces of said mirror are substantially perpendicular to each other, one of said surfaces being oriented substantially perpendicular with respect to the reference line.

3. A system as recited in claim 1, wherein said control circuit is operable to command said gimbal drive system to align the optical axis of said collimator with respect to a housing enclosing said second inertial sensor, and to determine and store differences in the relative orientation of said optical axis and said reference line when said second inertial sensor is moved.

4. A system as recited in claim 1, further comprising a reference mirror mountable on said first inertial sensor and having at least two surfaces for reflecting an electromagnetic energy beam generated by said beam generator and collimated by said collimator about two axes, said control circuit being operable to command said gimbal drive system to align said collimated beam to be substantially perpendicular with respect to at least one of said surfaces by adjusting said gimbal, and to use said gyroscope output signals and data relating to the position of said gimbal relative to said reference line to determine the orientation of said device with respect to said reference line.

5. A system as recited in claim 4, wherein said gimbal and gimbal drive system can be operated in accordance with a predetermined offset between said device to be aligned and said reference line.

6. A system as recited in claim 1, wherein said beam generator is operable to generate a laser beam having substantially the same optical axis as said collimator.

7. A system as recited in claim 6, further comprising a second beam generator for generating an infrared beam that is substantially parallel to said laser beam, said second inertial sensor being operable to direct said infrared beam to a device having infrared sensors to align said sensors with said laser.

8. A system as recited in claim 1, wherein at least one of said electromagnetic energy beam generator, said collimator and said at least two gyroscopes is mounted on a platform, said platform being mounted on said gimbal and adapted to move in accordance with signals from said gimbal drive system.

9. A system as recited in claim 8, wherein said control circuit is operable to generate command signals for said gimbal drive system to move said platform to a selected position in order to align an optical axis associated with said collimator so as to be substantially parallel to the reference line.

10. A method for aligning a device with respect to a reference line by transferring parallel and non-parallel lines, comprising the steps of:

aligning a stationary inertial sensor with respect to said reference line;

projecting an electromagnetic beam from a portable inertial sensor to a mirror coupled to said stationary inertial sensor and detecting the angle of the reflected beam;

determining the relative position of said portable inertial sensor with respect to said stationary inertial sensor using the detected angle and output data from each of a pair of gyroscopes provided in said stationary and said portable inertial sensors;

aligning said portable inertial sensor with respect to said device; and calculating the position of said device with respect to said reference line using said detected angle and said output data.

11. The method of claim 10, wherein said aligning step for said portable inertial unit comprises the step of controlling a gimballed platform carrying said gyroscopes and circuitry for generating said beam to operate a gimbal to orient said platform in accordance with a known offset position of the device with respect to the reference line.

12. The method of claim 10, wherein said aligning step for said portable inertial sensor comprises the steps of projecting an electromagnetic beam onto a mirror coupled to said device, and processing said reflected beam and said gyroscope output signals to determine the position of said portable sensor with respect to said device and the position of said device with respect to said reference line.

13. The method of claim 10, wherein said aligning step for said portable inertial sensor comprises the step of projecting an electromagnetic beam into said device.

14. The method of claim 10, wherein said aligning step for said portable inertial sensor comprises the step of projecting a reticle from said device onto said portable inertial sensor for processing.

15. The method of claim 10, wherein said determining step comprises the steps of:

determining torquer currents for each gyroscope;

generating direction cosine matrices using said torquer currents and data relating to said gyroscopes and gravity orientation to represent accumulated rotation of each gyroscope from the time said gyroscope was powered on;

generating a set of difference angles representing the orientation of said portable inertial unit to said portable inertial unit using said matrices; and converting said angles to angular rate outputs to be used by said gimbal to drive said portable inertial sensor to a selected orientation.

16. A system as recited in claim 1, wherein said collimator is an autocollimator.

* * * * *